(12) United States Patent
Yu et al.

(10) Patent No.: US 12,314,382 B2
(45) Date of Patent: May 27, 2025

(54) MODEL PROTECTION METHOD AND APPARATUS, DATA PROCESSING METHOD AND APPARATUS, AND DEVICE AND MEDIUM

(71) Applicant: CHINA UNIONPAY CO., LTD., Shanghai (CN)

(72) Inventors: Wenhai Yu, Shanghai (CN); Chengqian Chen, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 18/697,240

(22) PCT Filed: Aug. 15, 2022

(86) PCT No.: PCT/CN2022/112612
§ 371 (c)(1),
(2) Date: Mar. 29, 2024

(87) PCT Pub. No.: WO2023/115996
PCT Pub. Date: Jun. 29, 2023

(65) Prior Publication Data
US 2024/0394360 A1 Nov. 28, 2024

(30) Foreign Application Priority Data
Dec. 24, 2021 (CN) .......................... 202111596058.3

(51) Int. Cl.
*G06F 21/00* (2013.01)
*G06F 21/53* (2013.01)
*G06F 21/64* (2013.01)

(52) U.S. Cl.
CPC .............. *G06F 21/53* (2013.01); *G06F 21/64* (2013.01)

(58) Field of Classification Search
CPC ................................. G06F 21/53; G06F 21/64
See application file for complete search history.

(56) References Cited

U.S. PATENT DOCUMENTS 10,789,354 B1 * 9/2020 Pham ..................... G06F 21/577
11,017,322 B1 * 5/2021 Du ........................ G06N 20/00
(Continued)

FOREIGN PATENT DOCUMENTS

| CN | 110704850 A | 1/2020 |
|---|---|---|
| CN | 111291416 A | 6/2020 |

(Continued)

OTHER PUBLICATIONS

International Search Report and Written Opinion for PCT Appl. No. PCT/CN2022/112612, mailed on Nov. 2, 2022.

*Primary Examiner* — Ghodrat Jamshidi
(74) *Attorney, Agent, or Firm* — Foley & Lardner LLP

(57) ABSTRACT

Disclosed in the present application are a model protection method and apparatus, a data processing method and apparatus, and a device and a medium, which are used for improving the security protection of a model. In the present application, a cloud device can determine, from a target model, a first sub-model which is stored in a trusted execution environment (TEE) of a terminal device, and send the first sub-model to the terminal device; the terminal device can store the first sub-model in the TEE of the terminal device; and the TEE can ensure that data processing, etc., are performed in a trusted environment.

8 Claims, 6 Drawing Sheets

(56) References Cited

U.S. PATENT DOCUMENTS

| | | | |
|---|---|---|---|
| 11,423,259 B1* | 8/2022 | Pratusevich | G06N 20/00 |
| 11,651,081 B1* | 5/2023 | Powers | G06N 5/01 |
| | | | 726/25 |
| 2019/0362083 A1* | 11/2019 | Ortiz | H04L 9/321 |
| 2019/0392305 A1* | 12/2019 | Gu | G06F 21/53 |
| 2021/0034971 A1* | 2/2021 | Han | G06N 3/063 |
| 2021/0125300 A1* | 4/2021 | Alam | H04W 4/029 |
| 2021/0271963 A1* | 9/2021 | Amisano | G06N 3/08 |
| 2022/0114014 A1* | 4/2022 | Chen | G06N 3/045 |
| 2022/0245515 A1* | 8/2022 | Yi | G06F 21/6245 |
| 2024/0015028 A1* | 1/2024 | Wang | H04L 9/321 |
| 2024/0134965 A1* | 4/2024 | Gu | G06F 21/53 |

FOREIGN PATENT DOCUMENTS

| | | |
|---|---|---|
| CN | 112016666 A | 12/2020 |
| CN | 112106076 A | 12/2020 |
| CN | 112766495 A | 5/2021 |
| CN | 114491657 A | 5/2022 |
| TW | 202036347 A | 10/2020 |
| TW | I724813 B | 4/2021 |
| TW | I736883 B | 8/2021 |
| WO | WO-2019/192344 A1 | 10/2019 |

* cited by examiner

Target model M

First sub-model m2

Second sub-model m1

MODEL PROTECTION METHOD AND APPARATUS, DATA PROCESSING METHOD AND APPARATUS, AND DEVICE AND MEDIUM

CROSS-REFERENCE TO RELATED APPLICATIONS

The present application is a National Stage of International Application No. PCT/CN2022/112612, filed on Aug. 15, 2022, which claims the priority to Chinese patent application No. 202111596058.3 filed to China National Intellectual Property Administration on Dec. 24, 2021, of which the entire contents are incorporated herein by reference.

TECHNICAL FIELD

The present application relates to the field of computer technologies, in particular to a model protection method and apparatus, a data processing method and apparatus, and a device and medium.

BACKGROUND

In recent years, the artificial intelligence technology has achieved great success in many fields. Many companies are deploying models such as pre-trained neural network models in products to improve efficiency. Training for the model requires a lot of labor from the model designer, and is usually completed based on a large-scale data set and huge computing resources.

However, the issue of security protection for the model is a big problem faced by many companies. For example, in the process of data processing in the model, if security protection for the model is not appropriate, model parameters, the model structure and other information of the model may be leaked or even maliciously tampered with. Therefore, how to improve the security protection for the model is a technical problem that needs to be solved urgently.

SUMMARY

The present application provides a model protection method and apparatus, a data processing method and apparatus, and a device and medium, to improve the security protection for the model.

In a first aspect, the present application provides a model protection method, including:
  in a case of receiving a model distribution request from a terminal device, obtaining first identification information of a target model, a target size of to-be-processed data, and an attribute parameter of a trusted execution environment (TEE) of the terminal device carried in the model distribution request; where the attribute parameter includes at least one of a safe storage space and a safe running memory;
  obtaining the target model corresponding to the first identification information, and determining a target attribute parameter corresponding to the target size according to a predetermined correspondence between data sizes and attribute parameters of the target model;
  determining a first sub-model saved in the TEE of the terminal device in the target model according to the target attribute parameter and the attribute parameter of the TEE of the terminal device; and
  sending the first sub-model to the terminal device, so that the terminal device saves the first sub-model in the TEE of the terminal device.

In a second aspect, the present application provides a data processing method, including:
  receiving a data processing instruction, where the data processing instruction carries to-be-processed data and a target data type of the to-be-processed data; and determining a target model corresponding to the target data type according to a saved correspondence between data types and models;
  sending a model distribution request to a cloud device, where the model distribution request carries first identification information of the target model, a target size of the to-be-processed data, and an attribute parameter of a TEE of a terminal device; where the attribute parameter includes at least one of a safe storage space and a safe running memory;
  receiving a first sub-model from the cloud device, and saving the first sub-model in the TEE; where, the first sub-model is determined by: the cloud device obtaining the target model corresponding to the first identification information according to the first identification information, determining a target attribute parameter corresponding to the target size according to a predetermined correspondence between data sizes and attribute parameters of the target model, and determining the first sub-model saved in the TEE of the terminal device in the target model according to the target attribute parameter and the attribute parameter of the TEE of the terminal device; and
  processing the to-be-processed data based on the first sub-model.

In a third aspect, the present application provides a model protection apparatus, including:
  a first receiving module, configured to obtain first identification information of a target model, a target size of to-be-processed data, and an attribute parameter of a TEE of a terminal device carried in a model distribution request in a case of receiving the model distribution request from the terminal device; where the attribute parameter includes at least one of a safe storage space and a safe running memory;
  a first determining module, configured to obtain the target model corresponding to the first identification information, and determine a target attribute parameter corresponding to the target size according to a predetermined correspondence between data sizes and attribute parameters of the target model;
  a second determining module, configured to determine a first sub-model saved in the TEE of the terminal device in the target model according to the target attribute parameter and the attribute parameter of the TEE of the terminal device; and
  a sending module, configured to send the first sub-model to the terminal device, so that the terminal device saves the first sub-model in the TEE of the terminal device.

In a fourth aspect, the present application provides a data processing apparatus, including:
  a second receiving module, configured to receive a data processing instruction, where the data processing instruction carries to-be-processed data and a target data type of the to-be-processed data; and determine a target model corresponding to the target data type according to a saved correspondence between data types and models;

a request module, configured to send a model distribution request to a cloud device, where the model distribution request carries first identification information of the target model, a target size of the to-be-processed data, and an attribute parameter of a TEE of a terminal device; where the attribute parameter includes at least one of a safe storage space and a safe running memory;

a saving module, configured to receive a first sub-model from the cloud device, and save the first sub-model in the TEE; where the first sub-model is determined by: the cloud device obtaining the target model corresponding to the first identification information according to the first identification information, determining a target attribute parameter corresponding to the target size according to a predetermined correspondence between data sizes and attribute parameters of the target model, and determining the first sub-model saved in the TEE of the terminal device in the target model according to the target attribute parameter and the attribute parameter of the TEE of the terminal device; and a processing module, configured to process the to-be-processed data based on the first sub-model.

In a fifth aspect, the present application provides an electronic device, the electronic device includes at least a processor and a memory, and the processor is configured to: when executing a computer program stored in the memory, implement steps of any of the above model protection methods, or implement steps of any of the above data processing methods.

In a sixth aspect, the present application provides a computer-readable storage medium, storing a computer program. When the computer program is executed by a processor, the processor implements steps of any of the above model protection methods, or implements steps of any of the above data processing methods.

In a seventh aspect, the present application provides a computer program product, including computer program codes. The computer program codes, when run on a computer, enable the computer to implement steps of any of the above model protection methods, or implement steps of any of the above data processing methods.

In the embodiments of the present application, the cloud device can determine the first sub-model saved in the TEE of the terminal device in the target model, and send the first sub-model to the terminal device; and the terminal device can save the first sub-model in the TEE of the terminal device. Since the TEE can guarantee data processing in the trusted environment, when processing the to-be-processed data based on the model saved in the TEE of the terminal device, the model can be effectively protected and the safety of the model can be ensured in the embodiments of the present application. In addition, in the embodiments of the present application, it can be also ensured that the to-be-processed data is processed on the terminal device without sending the to-be-processed data to the cloud device for processing through the network, so as to ensure the security of the to-be-processed data, that is, in the present application, it can take into account the security of the to-be-processed data and the security of the model.

BRIEF DESCRIPTION OF FIGURES

In order to more clearly illustrate the embodiments of the present application or the implementation in the related technology, the following will briefly introduce the drawings that need to be used in the description of the embodiments or the related technology. Obviously, the drawings in the following description are the some embodiments of the present application, those skilled in the art can also obtain other drawings according to these drawings.

DETAILED DESCRIPTION

Figure 1:
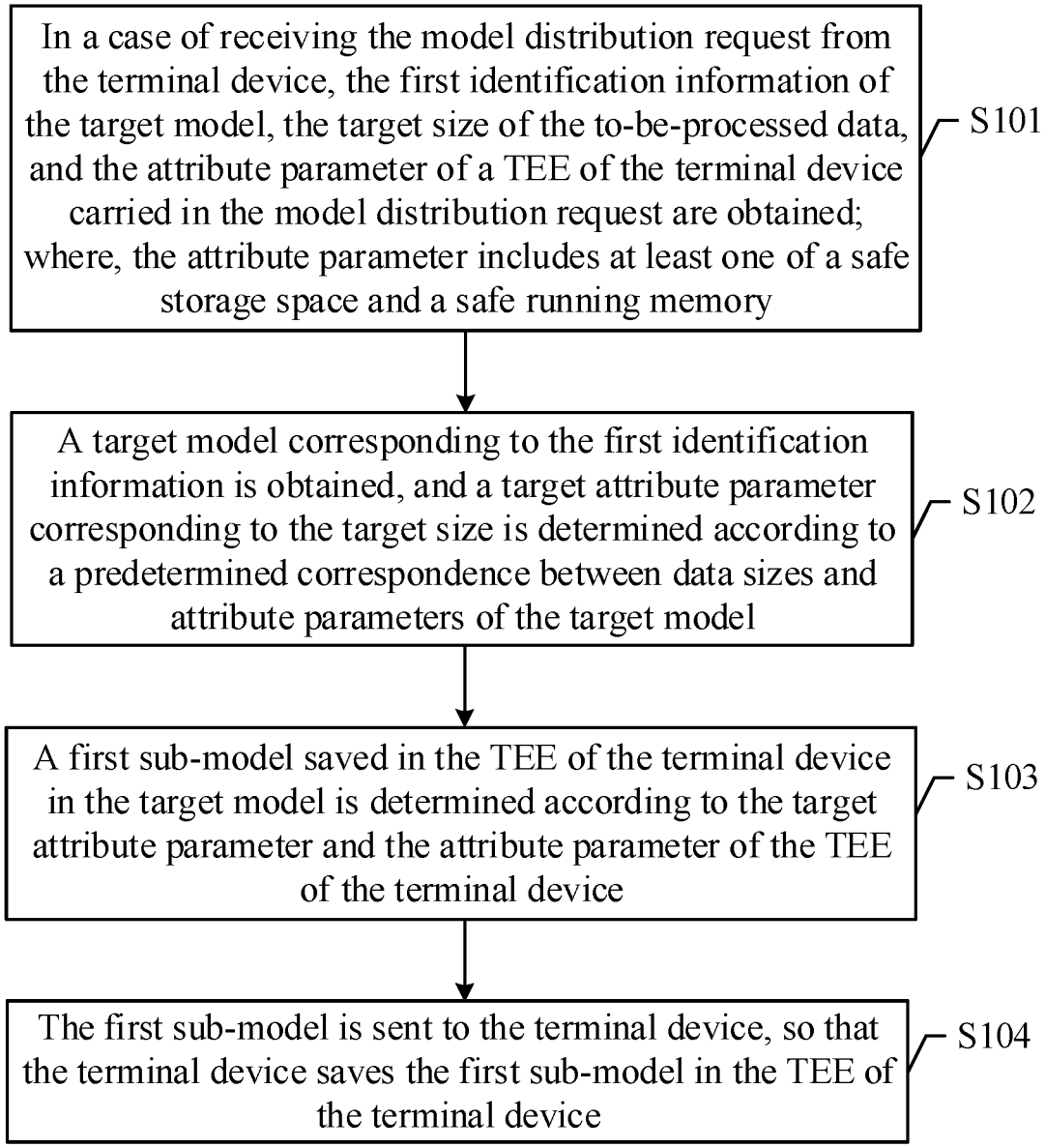
FIG. 1 shows a schematic diagram of a first model protection process provided by some embodiments.

In order to improve the security protection for the model, the present application provides a model protection method and apparatus, a data processing method and apparatus, and a device and medium.

To make purposes and embodiments of the present application clearer, the following will clearly and completely describe the illustrative embodiments of the present application in conjunction with drawings in the illustrative embodiments of the present application. Apparently, the illustrative embodiments described herein are merely part of the embodiments of the present application, and not all of them.

It should be indicated that, brief descriptions of terms in the present application are merely for facilitating understanding embodiments described below, not intended to limit the embodiments of the present application. Unless otherwise noted, these terms shall be understood according to ordinary and general meanings.

The terms "first", "second", "third", etc., in the description and claims of the present application and the above drawings are used to distinguish similar or like objects or entities, and do not necessarily mean limiting a specific order or sequence unless otherwise indicated. It should be understood that the terms when used are interchangeable in appropriate cases.

The terms "include" and "have", and any variations thereof, are intended to be inclusive but not exclusive, for example, a product or device including a series of components is not necessarily limited to all components clearly listed, but may include other components that are not clearly listed or are inherent to these products or devices.

The term "module" means any known or later developed hardware, software, firmware, artificial intelligence, fuzzy logic, or the combination of hardware or/and software code, and can perform the function associated with that elements.

Finally, it should be noted that: the above embodiments are only used to illustrate the technical solutions of the present application, and are not intended to limit them; although the present application has been described in detail with reference to the above embodiments, those of ordinary skill in the art should understand that: it is still possible to modify the technical solutions described in the above embodiments, or make equivalent replacements for some or all of the technical features; and these modifications or replacements do not make the essence of the corresponding technical solutions deviate from the scope of technical solutions of the embodiments of the present application.

For convenience of explanation, the above description has been made in conjunction with specific implementations. However, the above exemplary discussion is not intended to be exhaustive or to limit the implementations to the specific forms disclosed above. Various modifications and deformations can be obtained in accordance with the above teachings. The above implementations are selected and described for the purpose of better explaining the principles as well as the practical applications, so that those skilled in the art can better use the implementations and various different deformations of the implementations suitable for specific use considerations.

The design idea of the embodiments of the present application is briefly introduced below.

In a possible implementation, considering that if a complete model that has been trained is saved in a cloud device such as a cloud server, a cloud service provider of the cloud device can provide services to a user by providing only one interface (the user can process the to-be-processed data based on the model), thereby ensuring that the user cannot access the data information such as model parameters and the model structure of the model, and effectively ensuring the security (concealment) of the model. Therefore, the complete model that has been trained can be saved in the cloud device.

When the complete model is saved in the cloud device, if the user needs to process the to-be-processed data based on the model, the user also needs to upload the to-be-processed data to the cloud device through the network, etc., to process the to-be-processed data based on the model saved in the cloud device. However, by the method of uploading the to-be-processed data to the cloud device through the network, etc., and processing the to-be-processed data based on the model saved in the cloud device, on the one hand, there is a risk that the user's to-be-processed data may be leaked; on the other hand, it takes a certain amount of time to transmit the to-be-processed data through the network, etc., and there is a problem of low data processing efficiency.

In a possible implementation, in order to ensure the security of the to-be-processed data and improve the efficiency of data processing, it may be considered to save the model in the terminal device (such as an edge artificial intelligence device and the like) used by the user. When the model is saved in the terminal device, since the to-be-processed data and the model are saved in the same terminal device, there is no need to transmit the to-be-processed data through the network, thereby effectively guaranteeing the security of the to-be-processed data and improving the data processing efficiency. However, if the model that has been trained is saved in the terminal device, it is also a difficult problem on how to protect the model for security to ensure that information such as the model parameters, the model structure, etc., of the model are not leaked.

To sum up, how to take into account the security of the to-be-processed data and the security of the model is a technical problem that needs to be solved urgently at present.

In view of this, embodiments of the present application provide a model protection method and apparatus, a data processing method and apparatus, and a device and medium. The model protection method and apparatus, the data processing method and apparatus, and the device and medium provided in the embodiments of the present application are respectively introduced below.

Embodiment 1

FIG. 1 shows a schematic diagram of the first model protection process provided by some embodiments, and the process includes the following steps.

S101: in a case of receiving the model distribution request from the terminal device, the first identification information of the target model, the target size of the to-be-processed data, and the attribute parameter of a trusted execution environment (TEE) of the terminal device carried in the model distribution request are obtained; where, the attribute parameter includes at least one of a safe storage space and a safe running memory.

The model protection method provided in the embodiments of the present application is applied to a cloud device such as a cloud server.

In a possible implementation, when the user needs to process the to-be-processed data, the user may send the model distribution request to the cloud device through the terminal device. In a possible implementation, the model distribution request may carry the identification information (referred to as the first identification information for convenience of description) of the model (referred to as the target model for convenience of description) applicable to the to-be-processed data, the data size (referred to as the target size for convenience of description) of the to-be-processed data and the attribute parameter of the TEE of the terminal device. Exemplarily, the attribute parameter of the TEE includes at least one of the safe storage space and the safe running memory of the TEE.

After the cloud device receives the model distribution request sent by the terminal device, the cloud device can obtain the first identification information of the target model, the target size of the to-be-processed data, and the attribute parameter of the TEE of the terminal device carried in the model distribution request.

S102: the target model corresponding to the first identification information is obtained, and a target attribute parameter corresponding to the target size is determined according to a predetermined correspondence between data sizes and attribute parameters of the target model.

In a possible implementation, the cloud device may obtain a model corresponding to the first identification information (referred to as the target model for convenience of description) from models saved by itself. Considering that when the data sizes of the to-be-processed data are different, the attribute parameters such as the safe storage space and the safe running memory that the model needs to occupy when running are also different, therefore, the correspondence between each data size and the attribute parameter of the model can be determined in advance and saved. The cloud device can determine the attribute parameter (referred to as the target attribute parameter for convenience of description)

of the target model corresponding to the target size of the to-be-processed data according to the predetermined correspondence between the data sizes and the attribute parameters of the target model.

S103: a first sub-model saved in the TEE of the terminal device in the target model is determined according to the target attribute parameter and the attribute parameter of the TEE of the terminal device.

After the target attribute parameter of the target model corresponding to the target size of the to-be-processed data is determined, the cloud device can determine the sub-model (referred to as the first sub-model for the convenience of description) saved in the TEE of the terminal device in the target model according to the target attribute parameter and the attribute parameter of the TEE of the terminal device.

Where, when determining the first sub-model saved in the TEE of the terminal device in the target model, all or part of processing layers (where, for the convenience of description, any layer in the model that can be used to process the to-be-processed data is referred to as the processing layer in the embodiments of the present application) of the target model may be used as processing layers included in the first sub-model.

In a possible implementation, when determining the first sub-model saved in the TEE of the terminal device in the target model according to the target attribute parameter and the attribute parameter of the TEE of the terminal device, it may use all processing layers of the target model as the processing layers included in the first sub-model when each target attribute parameter is not greater than (less than or equal to) the attribute parameter corresponding to the TEE of the terminal device, that is, the target model is used as the first sub-model. In addition, it may also use part of the processing layers in the target model as the processing layer included in the first sub-model when any target attribute parameter is greater than the attribute parameter corresponding to the TEE of the terminal device, that is, a part of the target model is used as the first sub-model.

Exemplarily, taking the attribute parameters as the safe storage space and the safe running memory as an example, it is assumed that the TEE of the terminal device has 100 megabytes of the safe storage space, and 80 megabytes of the safe running memory. When the target model corresponding to the target size of the to-be-processed data has 20 megabytes of the safe storage space and 10 megabytes of the safe running memory, in a possible implementation, the target model may be used as the first sub-model.

However, when the target model corresponding to the target size of the to-be-processed data has 120 megabytes of the safe storage space and 90 megabytes of the safe running memory, or when the target model corresponding to the target size of the to-be-processed data has 50 megabytes of the safe storage space and 90 megabytes of the safe running memory, or when the target model corresponding to the target size of the to-be-processed data has 120 megabytes of the safe storage space and 10 megabytes of the safe running memory, a part of the target model can be used as the first sub-model.

S104: the first sub-model is sent to the terminal device, so that the terminal device saves the first sub-model in the TEE of the terminal device.

After the first sub-model saved in the TEE of the terminal device is determined, the first sub-model may be sent to the terminal device. Considering that the TEE can guarantee data processing in a trusted environment, when processing data based on the model saved in the TEE, the model can be effectively protected for security. Therefore, in the embodiments of the present application, the terminal device can save the first sub-model in its own TEE after receiving the first sub-model.

In the embodiments of the present application, the cloud device can determine the first sub-model saved in the TEE of the terminal device in the target model, and send the first sub-model to the terminal device; and the terminal device can save the first sub-model in the TEE of the terminal device. Since the TEE can guarantee data processing in the trusted environment, when processing the to-be-processed data based on the model saved in the TEE of the terminal device, the model can be effectively protected and the safety of the model can be ensured in the embodiments of the present application. In addition, in the embodiments of the present application, it can be also ensured that the to-be-processed data is processed on the terminal device without sending the to-be-processed data to the cloud device for processing through the network, so as to ensure the security of the to-be-processed data, that is, in the present application, it can take into account the security of the to-be-processed data and the security of the model.

Embodiment 2

In order to take into account the security of the to-be-processed data and the security of the model, on the basis of the above-mentioned embodiments, in the embodiments of the present application, after determining the target attribute parameter corresponding to the target size, and before determining the first sub-model saved in the TEE of the terminal device in the target model according to the target attribute parameter and the attribute parameter of the TEE of the terminal device, the method further includes:

determining processing layers of a to-be-sent model sent to the terminal device, where the processing layers of the to-be-sent model are all or part of processing layers of the target model; and updating the target model by using the to-be-sent model.

In a possible implementation, after determining the target attribute parameter corresponding to the target size of the to-be-processed data, and before determining the first sub-model saved in the TEE of the terminal device in the target model according to the target attribute parameter and the attribute parameter of the TEE of the terminal device, the processing layers of the to-be-sent model sent to the terminal device are further determined. For example, all the processing layers of the target model can be used as the processing layers of the to-be-sent model, or part of the processing layers of the target model can be used as the processing layers of the to-be-sent model.

Exemplarily, taking that the processing layers included in the target model according to an execution order are respectively a processing layer 1, a processing layer 2, a processing layer 3, a processing layer 4, . . . , a processing layer 10 as an example, the processing layer 1, the processing layer 2, the processing layer 3, the processing layer 4, the processing layer 5, and the processing layer 6 are determined as the processing layers included in the to-be-sent model. Optionally, the processing layer 7, the processing layer 8, the processing layer 9, and the processing layer 10 can be determined as a sub-model (for convenience of description, referred to as the third sub-model) saved in the cloud device. In a possible implementation, the processing layer 1, the processing layer 2, the processing layer 3, the processing layer 4, . . . , the processing layer 10 may all be used as processing layers of the to-be-sent model.

In a possible implementation, after the processing layers of the to-be-sent model is determined, the to-be-sent model may be used to update the target model, that is, the target model is updated to the to-be-sent model. Then, based on the updated target model, a subsequent step of determining the first sub-model saved in the TEE of the terminal device in the target model according to the target attribute parameter corresponding to the target size of the to-be-processed data and the attribute parameter of the TEE of the terminal device is performed.

Exemplarily, still taking the above embodiment as an example, assuming that the processing layers included in the target model are the processing layer 1, the processing layer 2, the processing layer 3, the processing layer 4, . . . , the processing layer 10 respectively, the processing layer 7, the processing layer 8, the processing layer 9, and the processing layer 10 (the set number of processing layers with a continuous execution order) are determined as processing layers included in the sub-model (for convenience of description, referred to as the third sub-model) saved in the cloud device. After the processing layer 1, the processing layer 2, the processing layer 3, the processing layer 4, the processing layer 5, and the processing layer 6 (the set number of processing layers with a continuous execution order) are determined as processing layers of the to-be-sent model, the target model is updated by using the to-be-sent model, and the target model is updated to a model that includes the processing layer 1, the processing layer 2, the processing layer 3, the processing layer 4, the processing layer 5, and the processing layer 6. Then the first sub-model saved in the TEE of the terminal device in the updated target model including the processing layer 1, the processing layer 2, the processing layer 3, the processing layer 4, the processing layer 5, and the processing layer 6 is determined.

It can be understood that if all the processing layers of the target model are used as the processing layers of the to-be-sent model, since the to-be-sent model is a model sent to the terminal device, the to-be-processed data can be processed based on the target model.

If part of the processing layers of the target model is used as the processing layers of the to-be-sent model, after the to-be-sent model is sent to the terminal device, the to-be-processed data can be processed based on part of the model (part of the processing layers of the target model) saved in the terminal device, and then the processing result (the intermediate processing result for the to-be-processed data) is sent to the cloud device. Then the processing result is processed based on another part of the model (the third sub-model) saved in the cloud device, so that the to-be-processed data can be fully processed based on the entire model.

Since the target model can be divided into the to-be-sent model and the third sub-model saved in the cloud device, for the third sub-model saved in the cloud device, the cloud service provider of the cloud device can provide services to a user by providing only one interface, to ensure the security of the third sub-model. In addition, the first sub-model saved in the terminal device in the to-be-sent model (the updated target model) is saved in the TEE of the terminal device, which can also ensure the security of the sub-model, so as to effectively prevent the risk of the data information of the model being leaked (stolen), and effectively guarantee the security of the model. In addition, since the intermediate processing result for the to-be-processed data is transmitted to the cloud device, the risk of leakage of the to-be-processed data can also be effectively prevented, and the security of the to-be-processed data can be effectively guaranteed. Therefore, the security of the to-be-processed data and the security of the model can be taken into account.

Embodiment 3

In order to accurately determine the first sub-model, on the basis of the above-mentioned embodiments, in the embodiment of the present application, the determining the first sub-model saved in the TEE of the terminal device in the target model according to the target attribute parameter and the attribute parameter of the TEE of the terminal device, includes:

selecting at least one first target processing layer from the target model; where a total value of attribute parameters of the at least one first target processing layer does not exceed a value of the attribute parameter corresponding to the TEE of the terminal device; and determining the first sub-model according to the selected at least one first target processing layer.

In a possible implementation, the first sub-model saved in the TEE of the terminal device in the target model may be determined based on a preset constraint condition. If the processing layer included in the first sub-model saved in the TEE is called the first target processing layer, the constraint condition can be: the total value of the attribute parameters of at least one first target processing layer selected from the target model cannot exceed the value of the attribute parameter corresponding to the TEE of the terminal device.

Exemplarily, taking the attribute parameter being the safe storage space as an example, in the target model corresponding to the target size of the to-be-processed data, if the safe storage space of the processing layer 1 is 1 megabyte, the safe storage space of the processing layer 2 is 2 megabytes, the safe storage space of the processing layer 3 is 3 megabytes, the safe storage space of the processing layer 4 is 4 megabytes . . . , and the safe storage space of the TEE of the terminal device is 8 megabytes, then the total value of the safe storage spaces of at least one first target processing layer selected from the target model cannot exceed the value of the safe storage space of the TEE of the terminal device. Exemplarily, the total value of the safe storage spaces of the processing layer 1, the processing layer 2, and the processing layer 3 is 6 megabytes, and the total value of the safe storage spaces of the processing layer 1, the processing layer 2, the processing layer 3, and the processing layer 4 is 10 megabytes, so the processing layer 1, the processing layer 2, and the processing layer 3 can be used as the first target processing layers respectively, and the first sub-model is determined based on the processing layer 1, the processing layer 2, and the processing layer 3. Because the total value of the safe storage spaces of the processing layer 1, the processing layer 2, the processing layer 3, and the processing layer 4 exceeds the value of the safe storage space of the TEE of the terminal device, the first sub-model cannot be determined based on the processing layer 1, the processing layer 2, the processing Layer 3, and the processing Layer 4.

In a possible implementation, after selecting at least one first target processing layer from the target model, each of other processing layers (for convenience of description, referred to as second target processing layers) in the target model except the first target processing layer is further determined, and then, based on each second target processing layer, the sub-model (for convenience of description, referred to as the second sub-model) saved in the rich execution environment (REE) of the terminal device in the target model is determined.

Exemplarily, still taking the above embodiment as an example, the processing layers included in the target model (the to-be-sent model) sent to the terminal device are: the processing layer 1, the processing layer 2, the processing layer 3, the processing layer 4, the processing layer 5 and the processing layer 6. If the processing layer 1, the processing layer 2, and the processing layer 3 are respectively used as the first target processing layers, and the first sub-model is determined based on the processing layer 1, the processing layer 2, and the processing layer 3; and then, the processing layer 4, the processing layer 5, and the processing layer 6 may be respectively used as the second target processing layers, and the second sub-model is determined based on the processing layer 4, the processing layer 5, and the processing layer 6.

After the first sub-model and the second sub-model are determined, the first sub-model and the second sub-model can be sent to the terminal device, so that the terminal device saves the first sub-model in the TEE of the terminal device, and saves the second sub-model in the REE of the terminal device.

Embodiment 4

In order to accurately determine the first sub-model, on the basis of the above embodiments, in the embodiment of the present application, the selecting of at least one first target processing layer from the target model includes:
ranking each processing layer according to the execution order of each processing layer of the target model; and
determining the first processing layer ranked first and the last processing layer ranked last in the ranking as processing layers included in the first target processing layers.

In a possible implementation, considering that the TEE of the terminal device can ensure data processing in the trusted environment and ensure the security of the model, when selecting the first target processing layer from the target model, each processing layer is ranked according to the execution order of each processing layer of the target model; and the first processing layer ranked first and the last processing layer ranked last in the ranking are determined as processing layers included in the first target processing layers.

Exemplarily, assuming that after each processing layer is ranked according to the execution order of each processing layer of the target model, the processing layers included in the target model are: the processing layer 1, the processing layer 2, the processing layer 3, the processing layer 4, the processing layer 5 and the processing layer 6, then at least the processing layer 1 and the processing layer 6 can be selected (determined) as the processing layers included in the first target processing layers, thereby ensuring that when the to-be-processed data is processed in the terminal device, both the processing layer to which the to-be-processed data is input initially and the processing layer to which the to-be-processed data is output finally are processing layers in the TEE, so that the security of the to-be-processed data can be further ensured.

Embodiment 5

In order to accurately determine the first sub-model, on the basis of the above embodiments, in the embodiment of the present application, the selecting of at least one first target processing layer from the target model includes:
if the attribute parameter further includes a central processing unit (CPU) peak computing performance of the TEE and a CPU peak computing performance of the REE of the terminal device and the CPU peak computing performance of the TEE of the terminal device is inferior to the CPU peak computing performance of the REE of the terminal device, determining the first target layer number according to the preset layer ratio threshold and the total number of processing layers included in the target model; and selecting the first target layer number of processing layers from the target model, and determining the selected processing layers with the first target layer number as the at least one first target processing layer.

In a possible implementation, it may be determined how to select the first target processing layer from the target model by comparing the CPU peak computing performance of the TEE of the terminal device with the CPU peak computing performance of the REE of the terminal device. When the attribute parameter carried in the model distribution request further includes the CPU peak computing performance of the TEE and the CPU peak computing performance of the REE of the terminal device, and the CPU peak computing performance of the TEE of the terminal device is inferior to the CPU peak computing performance of the REE of the terminal device, the first target layer number is determined according to the preset layer ratio threshold and the total number of processing layers included in the target model; and then the first target layer number of processing layers are selected from the target model, the selected processing layers with the first target layer number are determined as the at least one first target processing layer, and the first sub-model is determined based on the selected at least one first target processing layer.

Exemplarily, if the preset layer ratio threshold (the lowest layer ratio threshold) is 20%, and the total number of processing layers included in the target model is 10, then the first target layer number may be determined based on the product of the preset layer ratio threshold and the total number of processing layers included in the target model, that is, the first target layer number is 2. Then, two processing layers may be selected from the target model, the selected two processing layers are determined as the first target processing layers, and the first sub-model are determined based on the selected two first target processing layers.

It can be understood that when selecting the first target processing layer, it is still necessary to select (determine) the first target processing layer based on the preset constraint condition, that is, the total value of the attribute parameters of the selected first target processing layers does not exceed the value of the attribute parameter corresponding to the TEE of the terminal device.

In a possible implementation, considering that attribute parameters such as the safe storage space and the safe running memory of the TEE are usually lower than the attribute parameters corresponding to the REE, in order to maximize the assurance that when determining the first target layer number according to the preset layer ratio threshold and the total number of processing layers included in the target model, the total value of the attribute parameters of the selected processing layers with the first target layer number (the first target processing layers) does not exceed the value of the attribute parameter corresponding to the TEE of the terminal device, and each processing layer can be ranked according to the ascending order of the values of the attribute parameters of all processing layers of the target model when selecting the first target layer number of processing layers from the target model; and then, starting from the processing layer ranked first in the ranking, the first target layer number of processing layers are sequentially selected from the ranking.

Exemplarily, still taking the above embodiment as an example, the attribute parameter being the safe storage space is taken as an example, and it is assumed that in the target model corresponding to the target size of the to-be-processed data, the safe storage space of the processing layer 1 is 1 megabyte, the safe storage space of the processing layer 2 is 2 megabytes, the safe storage space of the processing layer 3 is 3 megabytes, the safe storage space of the processing layer 4 is 4 megabytes, and the safe storage space of the processing layer 5 is 5 megabytes, . . . , then each processing layer can be ranked according to an ascending order of values of safe storage spaces of all processing layers of the target model, and the ranked processing layers are: the processing layer 1, the processing layer 2, the processing layer 3, the processing layer 4, the processing layer 5 . . . . Assuming that the first target layer number is 2, starting from a processing layer ranked first in the ranking, two processing layers are selected from the ranking sequentially, that is, the processing layer 1 and the processing layer 2 can be determined as the first target processing layers.

Each processing layer can be ranked according to an ascending order of values of attribute parameters of all processing layers of the target model; and then, starting from the processing layer ranked first in the ranking, the first target layer number of processing layers are selected from the ranking sequentially, so as to further ensure that the total value of the attribute parameters of the selected first target processing layers does not exceed the value of the attribute parameter corresponding to the TEE of the terminal device.

In a possible implementation, when the attribute parameter carried in the model distribution request further includes the CPU peak computing performance of the TEE and the CPU peak computing performance of the REE of the terminal device, and the CPU peak computing performance of the TEE of the terminal device is equal to the CPU peak computing performance of the REE of the terminal device, when selecting the first target processing layer from the target model, first target processing layers can be selected as many as possible from the target model according to the attribute parameter of the TEE of the terminal device, as long as the selected first target processing layers satisfy the preset constraint condition, that is, as long as the total value of the attribute parameters of the selected first target processing layers does not exceed the value of the attribute parameter corresponding to the TEE of the terminal device. Details will not be repeated here.

In a possible implementation, in order to accurately determine the first sub-model, multiple constraint conditions can be configured, and based on a multi-objective optimization algorithm, the first target processing layer is selected. Specifically, the selecting of at least one first target processing layer from the target model includes:

ranking each processing layer according to an ascending order of values of attribute parameters of all processing layers of the target model;

starting from a processing layer ranked first in the ranking each time, respectively and sequentially selecting different numbers of processing layers from the ranking, and determining the different numbers of processing layers selected each time as different candidate processing layer combinations respectively; where, a total value of the attribute parameters of processing layers in each of the candidate processing layer combinations does not exceed the attribute parameter corresponding to the TEE of the terminal device;

for each of the candidate processing layer combinations, determining a candidate layer number ratio of a layer number of processing layers in the candidate processing layer combination to a total number of processing layers in the target model; and determining a candidate running time corresponding to the candidate processing layer combination according to a pre-saved correspondence among each data size, a candidate processing layer combination and a running time;

based on a multi-objective optimization algorithm, determining a target processing layer combination corresponding to an optimal layer number ratio and an optimal running time from each candidate layer number ratio and each candidate running time; and determining each processing layer in the target processing layer combination as the at least one first target processing layer.

In a possible implementation, when selecting the first target processing layer based on the multi-objective optimization algorithm, each processing layer of the target model can be firstly ranked according to an ascending order of values of attribute parameters of all processing layers of the target model. The ranking process is the same as that in the above-mentioned embodiments, and will not be repeated here.

Then, starting from the processing layer ranked first in the ranking, different numbers of processing layers are selected from the ranking respectively and sequentially, and the different numbers of processing layers selected each time are respectively used as different candidate processing layer combinations; where, the total value of the attribute parameters of processing layers included in each candidate processing layer combination does not exceed the attribute parameter corresponding to the TEE of the terminal device.

Exemplarily, assuming that the ranked processing layers are: the processing layer 1, the processing layer 2, the processing layer 3, the processing layer 4, the processing layer 5, and the processing layer 6, then the processing layer 1 can be used as the first candidate processing layer combination; the processing layer 1 and the processing layer 2 are used as the second candidate processing layer combination; and the processing layer 1, the processing layer 2 and the processing layer 3 are used as the third candidate processing layer combination, etc.

After each candidate processing layer combination is selected, for each candidate processing layer combination, the candidate layer number ratio of the layer number of processing layers included in the candidate processing layer combination to the total number of processing layers included in the target model is determined.

Exemplarily, still taking the above embodiment as an example, assuming that the total number of processing layers included in the target model is 6, then the candidate layer number ratio of the first candidate processing layer combination is 1/6, the candidate layer number ratio of the second candidate processing layer combination is 1/3, and the candidate layer number ratio of the third candidate processing layer combination is 1/2.

In a possible implementation, the correspondence among each data size, a candidate processing layer combination and a running time (the running time of the candidate processing layer combination when processing data of a certain data size) can be determined in advance, and saved. The correspondence among each data size, the candidate processing layer combination and the running time may be determined by using the prior art, which will not be repeated here. Then, for each candidate processing layer combination, the running time (for convenience of description, referred to as the candidate running time) corresponding to the candidate processing layer combination can be determined according to the pre-saved correspondence among each data size, the candidate processing layer combination and the running time.

In a possible implementation, both the layer number ratio and the running time can be used as the constraint condition (optimization objective); and based on a multi-objective optimization algorithm, a candidate processing layer combination (for convenience of description, referred to as the target processing layer combination) corresponding to an optimal layer number ratio and an optimal running time is determined from each candidate layer number ratio and each candidate running time.

After the target processing layer combination is determined, each processing layer included in the target processing layer combination may be determined as the first target processing layer in the first sub-model.

Embodiment 6

In order to accurately determine the first sub-model, on the basis of the above embodiments, in the embodiment of the present application, the selecting of at least one first target processing layer from the target model includes:
in a case that the target model includes a verification layer, determining the verification layer as a processing layer in the first target processing layer; where an execution order of a first sub-verification layer in the verification layer is before the execution order of any processing layer in the target model, and an execution order of a second sub-verification layer in the verification layer is after the execution order of any processing layer in the target model; where the verification layer is configured to verify whether a processing result of the target model on the to-be-processed data is trusted.

In a possible implementation, a verification layer can be inserted into the target model, and based on the verification layer, it can be verified whether the processing result of the target model on the to-be-processed data is trusted, thereby determining whether the target model is currently tampered with, and determining whether the processing result of the target model on the to-be-processed data is trusted.

Specifically, if the target model includes a verification layer, the verification layer can be determined as the processing layer included in the first target processing layer (the first sub-model); where, the verification layer includes the first sub-verification layer (such as the Cb layer) and the second sub-verification layer (such as the Dec layer), the execution order of the first sub-verification layer is before the execution order of any processing layer included in the target model, and the execution order of the second sub-verification layer is after the execution order of any processing layer included in the target model. Regarding how to verify whether the processing result of the target model on the to-be-processed data is trusted based on the verification layer, reference may be made to related embodiments below, which will not be repeated here.

For the convenience of understanding, the process of selecting the first target processing layer from the target model provided by the embodiments of the present application is illustrated below through a specific embodiment.

Figure 2A:
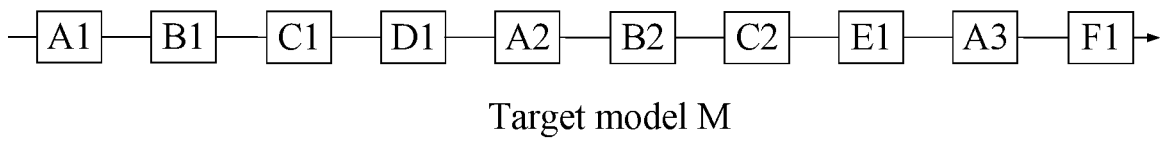
FIG. 2A shows a schematic structural diagram of a target model provided by some embodiments.

Referring to FIG. 2A, FIG. 2A shows a schematic structural diagram of a target model provided by some embodiments. Assuming that all processing layers included in the target model M are ranked according to the execution order as: A1, B1, C1, D1, A2, B2, C2, E1, A3 and F1 respectively, in a possible implementation, B1, D1, B2, E1 and F1 may be determined as the processing layers included in the first sub-model (the first target processing layers).

In a possible implementation, the first processing layer A1 ranked first and the last processing layer F1 ranked last in the ranking are determined as the processing layers included in the first sub-model (the first target processing layers). For example, A1, D1, A2, E1, and F1 may be determined as the processing layers included in the first sub-model (the first target processing layers).

Figure 2B:
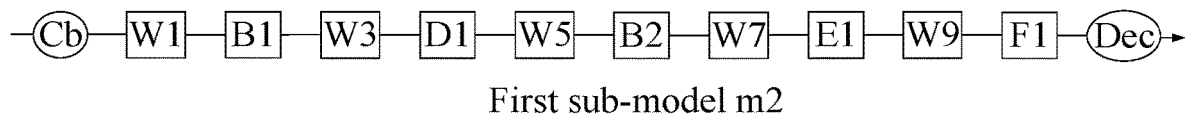
FIG. 2B shows a schematic structural diagram of a first sub-model provided by some embodiments.

As another example, it is assumed that the target model M includes not only the above processing layers, but also a verification layer, where the first sub-verification layer in the verification layer is the Cb layer, and the second sub-verification layer in the verification layer is the Dec layer. Referring to FIG. 2B, FIG. 2B shows a schematic structural diagram of a first sub-model provided by some embodiments, and the Cb layer, B1, D1, B2, E1, F1, and the Dec layer can all be determined as the processing layers included in the first sub-model (the first target processing layers). Since the execution order of the first sub-verification layer in the verification layer is before the execution order of any processing layer included in the target model, and the execution order of the second sub-verification layer in the verification layer is after the execution order of any processing layer included in the target model, the verification layer is determined as the processing layer included in the first target processing layer, which can also realize the purpose that the first processing layer ranked first and the last processing layer ranked last according to the execution order is determined as the processing layers included in the first sub-model (the first target processing layers).

Embodiment 7

In order to accurately determine the first sub-model, on the basis of the above embodiments, in the embodiment of the present application, the determining of the sub-model based on the selected at least one target processing layer includes:
for the sub-model saved in any of the TEE or REE, comparing the target processing layer in the sub-model with processing layers in the target model, and determining each missing processing layer that is in the target model but not in the sub-model; for each missing processing layer, configuring a link layer corresponding to the missing processing layer, and configuring, in level indication information of the link layer, second identification information of a next processing layer the execution order of which is after the link layer according to execution order information of each processing layer in the target model; determining the execution order of each link layer and the target processing layer in the sub-model according to the execution order of each processing layer in the target model; and determining the sub-model based on the execution order and each link layer and the target processing layer in the sub-model.

In a possible implementation, when determining the first sub-model based on the selected first target processing layer, the first target processing layer included in the first sub-model can be compared with the processing layers included in the target model, and each missing processing layer that is in the target model but not in the first sub-model is determined; and then, for each missing processing layer, the link layer corresponding to the missing processing layer is configured, and for each link layer, the identification information (for convenience of description, referred to as the second identification information) of a next processing layer the execution order of which is after the link layer is configured in level indication information of the link layer according to execution order information of each processing layer in the target model. Optionally, the identification information of the previous processing layer the execution order of which is before the link layer may also be configured in the level indication information of the link layer. Then, according to the execution order of each processing layer included in the target model, the execution order of each link layer and the first target processing layer included in the first sub-model are determined; and the first sub-model is determined based on the execution order and each link layer and the first target processing layer included in the first sub-model.

Based on the same technical concept, when determining the second sub-model based on the selected second target processing layer, the second target processing layer included in the second sub-model can be compared with the processing layers included in the target model, and each missing processing layer that is in the target model but not in the second sub-model is determined; and then, for each missing processing layer, the link layer corresponding to the missing processing layer is configured, and for each link layer, the identification information (for convenience of description, referred to as the second identification information) of a next processing layer the execution order of which is after the link layer is configured in level indication information of the link layer according to execution order information of each processing layer in the target model. Optionally, the identification information of the previous processing layer the execution order of which is before the link layer may also be configured in the level indication information of the link layer. Then, according to the execution order of each processing layer included in the target model, the execution order of each link layer and the second target processing layer included in the second sub-model are determined; and based on the execution order and each link layer and the second target processing layer included in the second sub-model, the second sub-model is determined.

Where, each link layer may only be responsible for forwarding data information such as the to-be-processed data and the current processing result for the to-be-processed data, without processing the to-be-processed data.

Still taking the above-mentioned embodiment as an example, referring to FIG. 2A, it is assumed that the target model M includes not only the above processing layers (A1, B1, C1, D1, A2, B2, C2, E1, A3, and F1), but also a verification layer, where the first sub-verification layer in the verification layer is the Cb layer, and the second sub-verification layer in the verification layer is the Dec layer.

Figure 2C:
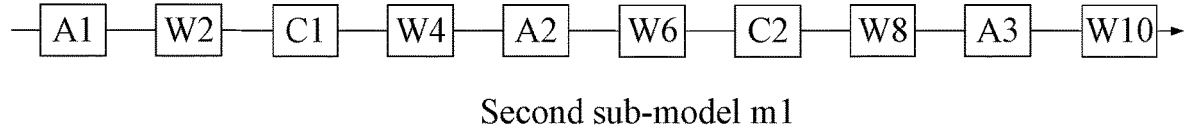
FIG. 2C shows a schematic structural diagram of a second sub-model provided by some embodiments.

Referring to FIG. 2B, according to the above execution order, the first target processing layers included in the first sub-model except the verification layer are: B1, D1, B2, E1 and F1 respectively. Referring to FIG. 2C, FIG. 2C shows a schematic structural diagram of a second sub-model provided by some embodiments, and the second target processing layers included in the second sub-model are: A1, C1, A2, C2 and A3 respectively.

Each missing processing layer that is in the target model but not in the first sub-model can be determined; and then, for each missing processing layer, the link layer corresponding to the missing processing layer is configured. Referring to FIG. 2B, for the first sub-model, the configured link layers are W1, W3, W5, W7, and W9 respectively. For each link layer, according to the execution order information of each processing layer included in the target model, the identification information (for convenience of description, referred to as the second identification information) of the next processing layer the execution order of which is after the link layer and the identification information of the previous processing layer the execution order of which is before the link layer can be configured in the level indication information of the link layer.

Similarly, each missing processing layer that is in the target model but not in the second sub-model can be determined; and then, for each missing processing layer, the link layer corresponding to the missing processing layer is configured. Referring to FIG. 2C, for the second sub-model, the configured link layers are W2, W4, W6, W8, and W10 respectively. For each link layer, according to the execution order information of each processing layer included in the target model, the second identification information of the next processing layer the execution order of which is after the link layer and the identification information of the previous processing layer the execution order of which is before the link layer can be configured in the level indication information of the link layer.

Exemplarily, for the link layer W1, the identification information of the previous processing layer configured in the level indication information of the link layer W1 may be the Cb layer, and the identification information of the next processing layer configured in the level indication information of the link layer W1 may be the A1 layer in the second sub-model m2.

For the link layer W2, the identification information of the previous processing layer configured in the level indication information of the link layer W2 may be the A1 layer in the second sub-model m2, and the identification information of the next processing layer configured in the level indication information of the link layer W2 may be the B1 layer in the first sub-model m1.

For the link layer W3, the identification information of the previous processing layer configured in the level indication information of the link layer W3 may be the B1 layer in the first sub-model m1, and the identification information of the next processing layer configured in the level indication information of the link layer W3 may be the C1 layer in the second sub-model m2.

For the link layer W4, the identification information of the previous processing layer configured in the level indication information of the link layer W4 may be the C1 layer in the second sub-model m2, and the identification information of the next processing layer configured in the level indication information of the link layer W4 may be the D1 layer in the first sub-model m1.

For the link layer W5, the identification information of the previous processing layer configured in the level indication information of the link layer W5 may be the D1 layer in the first sub-model m1, and the identification information of the next processing layer configured in the level indication information of the link layer W5 may be the A2 layer in the second sub-model m2.

For the link layer W6, the identification information of the previous processing layer configured in the level indication information of the link layer W6 may be the A2 layer in the second sub-model m2, and the identification information of the next processing layer configured in the level indication information of the link layer W6 may be the B2 layer in the first sub-model m1.

For the link layer W7, the identification information of the previous processing layer configured in the level indication information of the link layer W7 may be the B2 layer in the first sub-model m1, and the identification information of the next processing layer configured in the level indication information of the link layer W7 may be the C2 layer in the second sub-model m2.

For the link layer W8, the identification information of the previous processing layer configured in the level indication information of the link layer W8 may be the C2 layer in the second sub-model m2, and the identification information of the next processing layer configured in the level indication information of the link layer W8 may be the E1 layer in the first sub-model m1.

For the link layer W9, the identification information of the previous processing layer configured in the level indication information of the link layer W9 may be the E1 layer in the first sub-model m1, and the identification information of the next processing layer configured in the level indication information of the link layer W9 may be the A3 layer in the second sub-model m2.

For the link layer W10, the identification information of the previous processing layer configured in the level indication information of the link layer W10 may be the A3 layer in the second sub-model m2, and the identification information of the next processing layer configured in the level indication information of the link layer W10 may be the F1 layer in the first sub-model m1.

In a possible implementation, the execution order of each link layer and the first target processing layer included in the first sub-model may be determined according to the execution order of each processing layer included in the target model, and then the first sub-model is determined based on the execution order and each link layer and the first target processing layer included in the first sub-model. Exemplarily, referring to FIG. 2B, all layers included in the first sub-model are ranked according to the execution order as: Cb-W1-B1-W3-D1-W5-B2-W7-E1-W9-F1-Dec.

Referring to FIG. 2C, all layers included in the second sub-model are ranked according to the execution order as: A1-W2-C1-W4-A2-W6-C2-W8-A3-W10.

By adding the link layers to the first sub-model and the second sub-model, the first sub-model and the second sub-model can respectively restore (have) the same complete network connection structure as the target model, and the terminal device can correctly process the to-be-processed data based on the first sub-model and the second sub-model. In a possible implementation, in order to protect the model for security, only the layer number information of the corresponding missing processing layer may be retained in the link layer, and the information such as the name and type of the corresponding missing processing layer may be all deleted.

In a possible implementation, for the first sub-model or the second sub-model, when at least two missing processing layers in the sub-model are at least two processing layers with consecutive execution orders, multiple missing processing layers with the consecutive execution orders may be configured with one linking layer, and the layer number information of the linking layer is the layer number information of the corresponding multiple missing processing layers with the consecutive execution orders.

Figure 3A:
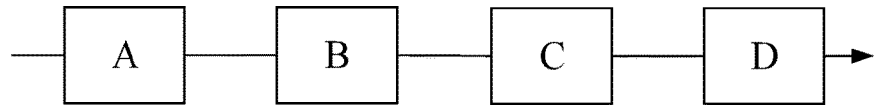
FIG. 3A shows a schematic structural diagram of another target model provided by some embodiments.

For example, referring to FIG. 3A, which shows a schematic structural diagram of another target model provided by some embodiments, it is assumed that the processing layers included in the target model are ranked according to the execution order as: A, B, C, D.

Figure 3B:
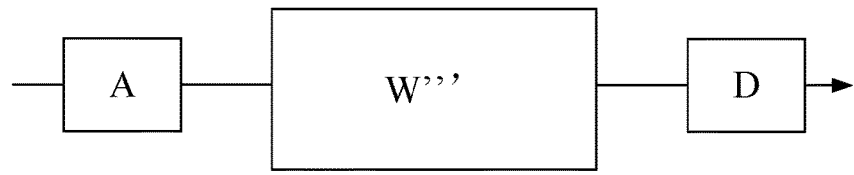
FIG. 3B shows a schematic structural diagram of another first sub-model provided by some embodiments.
Figure 3C:
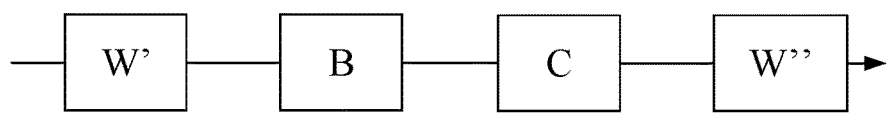
FIG. 3C shows a schematic structural diagram of another second sub-model provided by some embodiments.

Where, referring to FIG. 3B, which shows a schematic structural diagram of another first sub-model provided by some embodiments, the processing layers included in the first sub-model are A and D. Referring to FIG. 3C, which shows a schematic structural diagram of another second sub-model provided by some embodiments, the processing layers included in the second sub-model are B and C, the missing processing layers B and C in the first sub-model are processing layers with consecutive execution orders, and one link layer W''' may be configured for the missing processing layer B and the missing processing layer C.

Exemplarily, for the link layer W''', the identification information of the previous processing layer configured in the level indication information of the link layer W''' may be the A layer, and the identification information of the next processing layer configured in the level indication information of the link layer W''' may be the B layer in the second sub-model.

For the link layer W'', the identification information of the previous processing layer configured in the level indication information of the link layer W'' may be the C layer, and the identification information of the next processing layer configured in the level indication information of the link layer W'' may be the D layer in the first sub-model.

Optionally, for the link layer W', the identification information of the next processing layer configured in the level indication information of the link layer W' may be the B layer.

Embodiment 8

Figure 4:
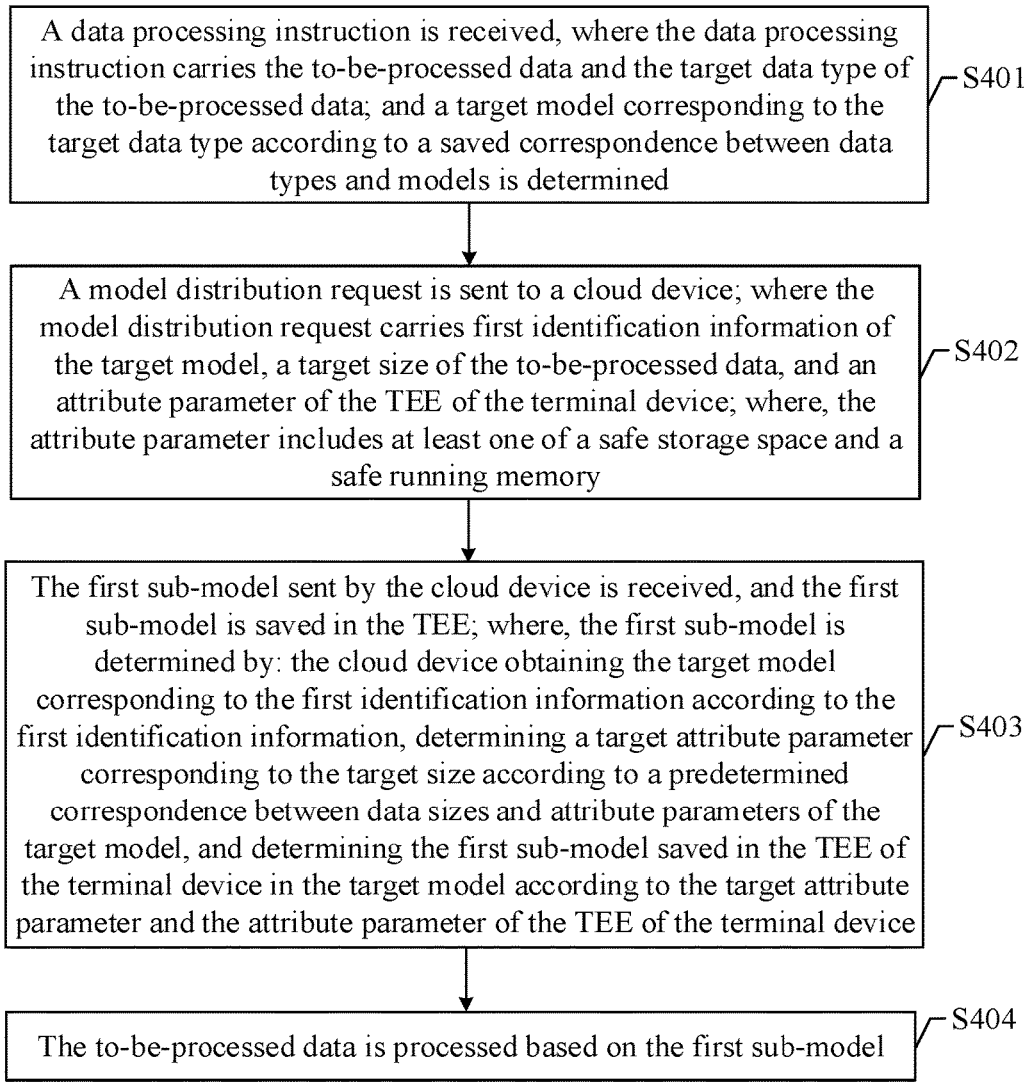
FIG. 4 shows a schematic diagram of a first data processing process provided by some embodiments.

Based on the same technical concept, embodiments of the present application provide a data processing method. FIG. 4 shows a schematic diagram of a first data processing process provided by some embodiments. As shown in FIG. 4, the process includes the following steps.

S401: a data processing instruction is received, where the data processing instruction carries the to-be-processed data and the target data type of the to-be-processed data; and a target model corresponding to the target data type according to a saved correspondence between data types and models is determined.

The data processing method provided in the embodiments of the present application is applied to a terminal device, and the terminal device may be a device such as a personal computer (PC), a mobile terminal, or an edge artificial intelligence (Edge AI) device.

In a possible implementation, when the user needs to process the to-be-processed data, the user can first trigger the data processing instruction in the terminal device; where the data processing instruction carries the to-be-processed data and the data type of the to-be-processed data (for convenience of description, referred to as the target data type). Exemplarily, the data type of the to-be-processed data may be a text, a voice, a picture and so on.

In order to accurately determine the model applicable to the to-be-processed data, the correspondence between data types and models may be saved in the terminal device in advance. The terminal device determines the model (for convenience of description, referred to as the target model) corresponding to the target data type of the to-be-processed data according to the saved correspondence between the data types and the models.

S402: a model distribution request is sent to a cloud device; where the model distribution request carries first identification information of the target model, a target size of the to-be-processed data, and an attribute parameter of the TEE of the terminal device; where, the attribute parameter includes at least one of a safe storage space and a safe running memory.

After the terminal device determines the to-be-processed data and the target model applicable to the to-be-processed data, the terminal device sends the model distribution request to the cloud device. The model distribution request carries the first identification information of the target model, the target size of the to-be-processed data, and the attribute parameter of the TEE of the terminal device. Optionally, the attribute parameter includes at least one of the safe storage space and the safe running memory.

S403: the first sub-model sent by the cloud device is received, and the first sub-model is saved in the TEE; where, the first sub-model is determined by: the cloud device obtaining the target model corresponding to the first identification information according to the first identification information, determining a target attribute parameter corresponding to the target size according to a predetermined correspondence between data sizes and attribute parameters of the target model, and determining the first sub-model saved in the TEE of the terminal device in the target model according to the target attribute parameter and the attribute parameter of the TEE of the terminal device.

After the terminal device sends the model distribution request to the cloud device, the cloud device obtains the target model corresponding to the first identification information according to the first identification information carried in the model distribution request, determines the target attribute parameter corresponding to the target size according to the predetermined correspondence between the data sizes and the attribute parameters of the target model, determines the first sub-model saved in the TEE of the terminal device in the target model according to the target attribute parameter and the attribute parameter of the TEE of the terminal device, and sends the first sub-model to the terminal device. Where, the process of the cloud device determining the first sub-model is the same as that of the above-mentioned embodiments, and will not be repeated here.

After receiving the first sub-model sent by the cloud device, the terminal device may save the first sub-model in the TEE.

S404: the to-be-processed data is processed based on the first sub-model.

After saving the first sub-model in the TEE, the terminal device processes the to-be-processed data based on the first sub-model saved in the TEE. Where, the prior art may be used to process the to-be-processed data based on the first sub-model, which will not be repeated here.

In the embodiments of the present application, the terminal device processes the to-be-processed data based on the first sub-model saved in its own TEE, so as to take into account the security of the model and the security of the to-be-processed data.

In a possible implementation, if the cloud device determines the first sub-model saved in the TEE of the terminal device and the second sub-model saved in the REE of the terminal device, the cloud device may send the first sub-model and the second sub-model to the terminal device; and the terminal device can save the first sub-model in the TEE of the terminal device itself, and save the second sub-model in the REE of the terminal device according to the identifications of the first sub-model and the second sub-model, etc. When processing the to-be-processed data, the terminal device may process the to-be-processed data based on the first sub-model saved in the TEE and the second sub-model saved in the REE.

Embodiment 9

In order to ensure the accuracy of the processing result for the to-be-processed data, on the basis of the above embodiments, in the embodiment of the present application, the processing of the to-be-processed data based on the first sub-model includes:

in a case that the target model includes a verification layer, determining position information of the preset verification data in the to-be-processed data based on the first sub-verification layer in the verification layer, determining the third identification information of the output processing layer from which the second sub-verification layer in the verification layer obtains the verification result of the verification data, and sending the position information and the third identification information to the second sub-verification layer; and based on the second sub-verification layer, obtaining the verification processing result output by the output processing layer of the third identification information, obtaining the verification result corresponding to the position information in the verification processing result, and determining whether the processing result of the target model on the to-be-processed data is trusted based on the verification result and a preset verification value.

In a possible implementation, when determining whether the processing result of the target model on the to-be-processed data is trusted based on the verification layer, position information of preset verification data in the to-be-processed data may be determined based on the first sub-verification layer in the verification layer. Where, the position information of the verification data in the to-be-processed data can be flexibly set according to requirements, which is not specifically limited in the present application. Exemplarily, taking the to-be-processed data being the text as an example, the verification data may be located before the first sentence, between the first sentence and the second sentence, after the last sentence, etc., of the to-be-processed data.

In addition, based on the first sub-verification layer in the verification layer, it can be determined from which processing layer the second sub-verification layer in the verification layer obtains the verification result of the verification data. For the convenience of description, the processing layer from which the second sub-verification layer obtains the verification result of the verification data is called the output processing layer, and the first sub-verification layer can determine the identification information (for convenience of description, referred to as the third identification information) of the output processing layer. Exemplarily, the output processing layer can be any processing layer included in the first sub-model. Referring to FIG. 2B, the output processing layer can be any processing layer such as F1, or B2, which can be flexibly set according to requirements, and is not specifically limited in the present application.

Where, the first sub-verification layer may send the position information of the preset verification data in the to-be-processed data and the third identification information to the second sub-verification layer. Based on the second sub-verification layer, the current processing result (for convenience of description, referred to as the verification processing result) of the to-be-processed data output by the output processing layer of the third identification information can be obtained. It can be understood that the verification processing result output by the output processing layer can be: the current processing result for the to-be-processed data from the first processing layer ranked first to the output processing layer, when ranking each processing layer according to the execution order of each processing layer of the target model.

When processing the to-be-processed data, the verification result, corresponding to the above position information, in the verification processing result may be obtained. Exemplarily, assuming that the verification data is located between the first sentence and the second sentence of the to-be-processed data, the corresponding information between the first sentence and the second sentence in the verification processing result can be determined as the verification result corresponding to the verification data.

In a possible implementation, the ideal verification value for the verification data from the first processing layer ranked first to the output processing layer may be determined in advance, and the ideal verification value is determined as the preset verification value. By comparing whether the above verification result is the same as the preset verification value, it is determined whether the processing result of the target model on the to-be-processed data is trusted. Exemplarily, when the deviation between the verification result and the preset verification value is less than a set deviation threshold, it is considered that the target model is not tampered with, and the processing result of the target model on the to-be-processed data is trusted. When the deviation between the verification result and the preset verification value is not less than the set deviation threshold, it is considered that the target model is tampered with, and the processing result of the target model on the to-be-processed data is not trusted. Where, the deviation threshold can be flexibly set according to requirements, which is not specifically limited in the present application.

In a possible implementation, if the processing result of the target model on the to-be-processed data is considered to be trusted, the second sub-verification layer can obtain the final processing result of the target model on the to-be-processed data, and after the verification result corresponding to the above position information in the final processing result is deleted, the processing result after the verification result is deleted is displayed for viewing by the user.

Embodiment 10

In order to accurately process the to-be-processed data, on the basis of the above embodiments, in the embodiment of the present application, the processing of the to-be-processed data based on the first sub-model and the second sub-model includes:

for the sub-model saved in any of the TEE or REE, in a case that the sub-model includes a link layer, obtaining second identification information, configured in level indication information of the link layer, of a next processing layer the execution order of which is after the link layer; and inputting a current processing result of the sub-model on the to-be-processed data to a processing layer corresponding to the second identification information according to the second identification information.

Specifically, for the first sub-model saved in the TEE, in a case that the first sub-model includes the link layer, the second identification information, configured in the level indication information of the link layer, of the next processing layer the execution order of which is after the link layer is obtained. Then, according to the second identification information, the current processing result of the first sub-model on the to-be-processed data is input into the processing layer corresponding to the second identification information.

For the second sub-model saved in the REE, in a case that the second sub-model includes the link layer, the second identification information, configured in the level indication information of the link layer, of the next processing layer the execution order of which is after the link layer is obtained. Then, according to the second identification information, the current processing result of the second sub-model on the to-be-processed data is input into the processing layer corresponding to the second identification information.

Figure 5:
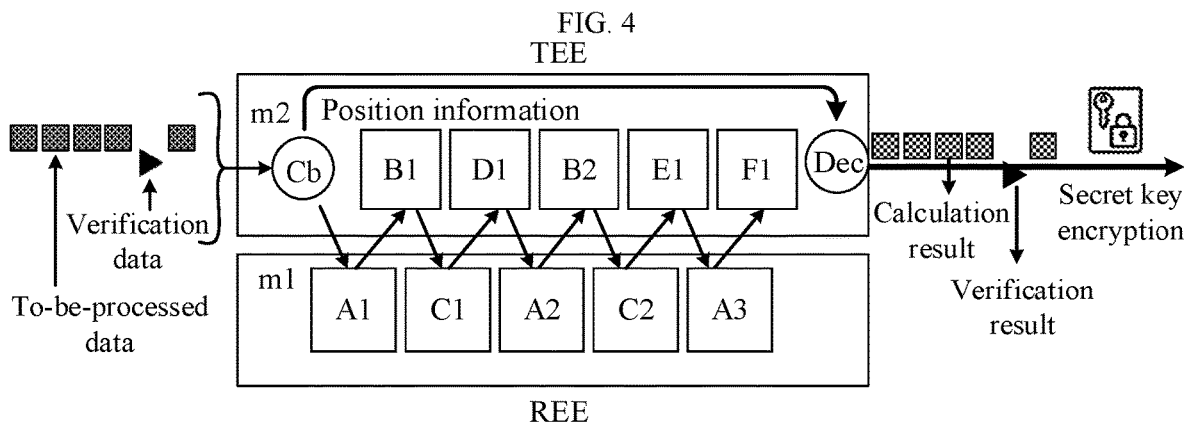
FIG. 5 shows a schematic diagram of a second data processing process provided by some embodiments.

For the convenience of understanding, the embodiments shown in FIG. 2A, FIG. 2B and FIG. 2C are still used as examples for illustration. FIG. 5 shows a schematic diagram of a second data processing process provided by some embodiments. Referring to FIG. 2A, FIG. 2B, FIG. 2C and FIG. 5, it is assumed that the to-be-processed data includes five sentences in total, and the position information of the verification data in the to-be-processed data is between the fourth sentence and the fifth sentence of the to-be-processed data. The third identification information of the output processing layer from which the second sub-verification layer Dec obtains the verification result (calculation result) of the verification data is the F1 processing layer, and the first sub-verification layer Cb can send the position information (p) and the third identification information (F1) of the output processing layer to the second sub-verification layer Dec.

According to the execution order of each processing layer included in the target model, the first sub-verification layer Cb can input the to-be-processed data carrying the verification data into the link layer W1 in the first sub-model, the identification information of the next processing layer configured in the level indication information of the link layer W1 is the A1 layer in the second sub-model m2, then the link layer W1 can forward the to-be-processed data carrying the verification data to the A1 layer in the second sub-model m2, and the current processing result (the processing result of the A1 processing layer on the to-be-processed data) can be output to the link layer W2 after the A1 processing layer processes the to-be-processed data carrying the verification data.

The identification information of the next processing layer configured in the level indication information of the link layer W2 is the B1 layer in the first sub-model m1, and the link layer W2 can forward the current processing result (the processing result of the A1 processing layer on the to-be-processed data) to the B1 layer in the first sub-model m1.

After the B1 layer in the first sub-model m1 processes the to-be-processed data carrying the verification data, the B1 layer in the first sub-model m1 can output the current processing result (the processing result of the A1 and B1 processing layers on the to-be-processed data) to the link layer W3.

The identification information of the next processing layer configured in the level indication information of the link layer W3 is the C1 layer in the second sub-model m2, and the link layer W3 can forward the current processing result (the processing result of the A1 and B1 processing layers on the to-be-processed data) to the C1 layer in the second sub-model m2.

After the C1 layer in the second sub-model m2 processes the to-be-processed data carrying the verification data, the C1 layer in the second sub-model m2 can output the current processing result (the processing result of the A1, B1, and C1 processing layers on the to-be-processed data) to the link layer W4.

The identification information of the next processing layer configured in the level indication information of the link layer W4 is the D1 layer in the first sub-model m1, and the link layer W4 can forward the current processing result (the processing result of the A1, B1, and C1 processing layers on the to-be-processed data) to the D1 layer in the first sub-model m1.

After the D1 layer in the first sub-model m1 processes the to-be-processed data carrying the verification data, the D1 layer in the first sub-model m1 can output the current processing result (the processing result of the A1, B1, C1, and D1 processing layers on the to-be-processed data) to the link layer W5.

The identification information of the next processing layer configured in the level indication information of the link layer W5 is the A2 layer in the second sub-model m2, and the link layer W5 can forward the current processing result (the processing result of the A1, B1, C1, and D1 processing layers on the to-be-processed data) to the A2 layer in the second sub-model m2.

After the A2 layer in the second sub-model m2 processes the to-be-processed data carrying the verification data, the A2 layer in the second sub-model m2 can output the current processing result (the processing result of the A1, B1, C1, D1, and A2 processing layers on the to-be-processed data) to the link Layer W6.

The identification information of the next processing layer configured in the level indication information of the link layer W6 is the B2 layer in the first sub-model m1, and the link layer W6 can forward the current processing result (the processing result of the A1, B1, C1, D1, and A2 processing layers on the to-be-processed data) to the B2 layer in the first sub-model m1.

After the B2 layer in the first sub-model m1 processes the to-be-processed data carrying the verification data, the B2 layer in the first sub-model m1 can output the current processing result (the processing result of the A1, B1, C1, D1, A2, and B2 processing layers on the to-be-processed data) to the link layer W7.

The identification information of the next processing layer configured in the level indication information of the link layer W7 is the C2 layer in the second sub-model m2, and the link layer W7 can forward the current processing result (the processing result of the A1, B1, C1, D1, A2, and B2 processing layers on the to-be-processed data) to the C2 layer in the second sub-model m2.

After the C2 layer in the second sub-model m2 processes the to-be-processed data carrying the verification data, the C2 layer in the second sub-model m2 can output the current processing result (the processing result of the A1, B1, C1, D1, A2, B2, and C2 processing layers on the to-be-processed data) to the link layer W8.

The identification information of the next processing layer configured in the level indication information of the link layer W8 is the E1 layer in the first sub-model m1, and the link layer W8 can forward the current processing result (the processing result of the A1, B1, C1, D1, A2, B2, and C2 processing layers on the to-be-processed data) to the E1 layer in the first sub-model m1.

After the E1 layer in the first sub-model m1 processes the to-be-processed data carrying the verification data, the E1 layer in the first sub-model m1 can output the current processing result (the processing result of the A1, B1, C1, D1, A2, B2, C2, and E1 processing layers on the to-be-processed data) to the link layer W9.

The identification information of the next processing layer configured in the level indication information of the link layer W9 is the A3 layer in the second sub-model m2, and the link layer W9 can forward the current processing result (the processing result of the A1, B1, C1, D1, A2, B2, C2, and A3 processing layers on the to-be-processed data) to the A3 layer in the second sub-model m2.

After the A3 layer in the second sub-model m2 processes the to-be-processed data carrying the verification data, the A3 layer in the second sub-model m2 can output the current processing result (the processing result of the A1, B1, C1, D1, A2, B2, C2, E1, and A3 processing layers on the to-be-processed data) to the link layer W10.

The identification information of the next processing layer configured in the level indication information of the link layer W10 is the F1 layer in the first sub-model m1, and the link layer W10 can forward the current processing result (the processing result of the A1, B1, C1, D1, A2, B2, C2, and A3 processing layers on the to-be-processed data) to the F1 layer in the first sub-model m1.

After the F1 layer in the first sub-model m1 processes the to-be-processed data carrying the verification data, the F1 layer in the first sub-model m1 can output the current processing result (the final processing result of the A1, B1, C1, D1, A2, B2, C2, E1, A3, and F1 processing layers on the to-be-processed data) to the second sub-verification layer Dec.

The second sub-verification layer Dec obtains the verification result of the target model on the verification data at the position between the fourth sentence and the fifth sentence in the processing result, and then determines whether the deviation between the verification result and the preset verification value is less than the set deviation threshold. If the deviation between the verification result and the preset verification value is less than the set deviation threshold, it is considered that the target model is not tampered with, and the processing result (calculation result) of the target model on the to-be-processed data is trusted. If the deviation between the verification result and the preset verification value is not less than the set deviation threshold, it is considered that the target model is tampered with, and the processing result of the target model on the to-be-processed data is not trusted.

In a possible implementation, when the deviation between the verification result and the preset verification value is less than the set deviation threshold, and the processing result of the target model on the to-be-processed data is considered to be trusted, the second sub-verification layer may delete the verification result at the position between the fourth sentence and the fifth sentence in the final processing result, encrypt the processing result via a symmetric secret key after the verification result is deleted, and present the encrypted processing result to the user. The user can decrypt the encrypted processing result to view the processing result.

Based on this, although the target model is divided into the first sub-model and the second sub-model, the to-be-processed data can still be processed based on the complete processing layers included in the target model and the execution order. Moreover, since the first sub-model is saved in the TEE, even if the second sub-model is saved in the REE, the model data information of the target model can be effectively prevented from being stolen since the second sub-model cannot be used independently, ensuring the security of the model.

In a possible implementation, if the third sub-model is saved in the cloud device, the terminal device can send the encrypted processing result to the cloud device; and the cloud device can decrypt the encrypted processing result, and then further process the to-be-processed data based on the third sub-model.

Figure 6:
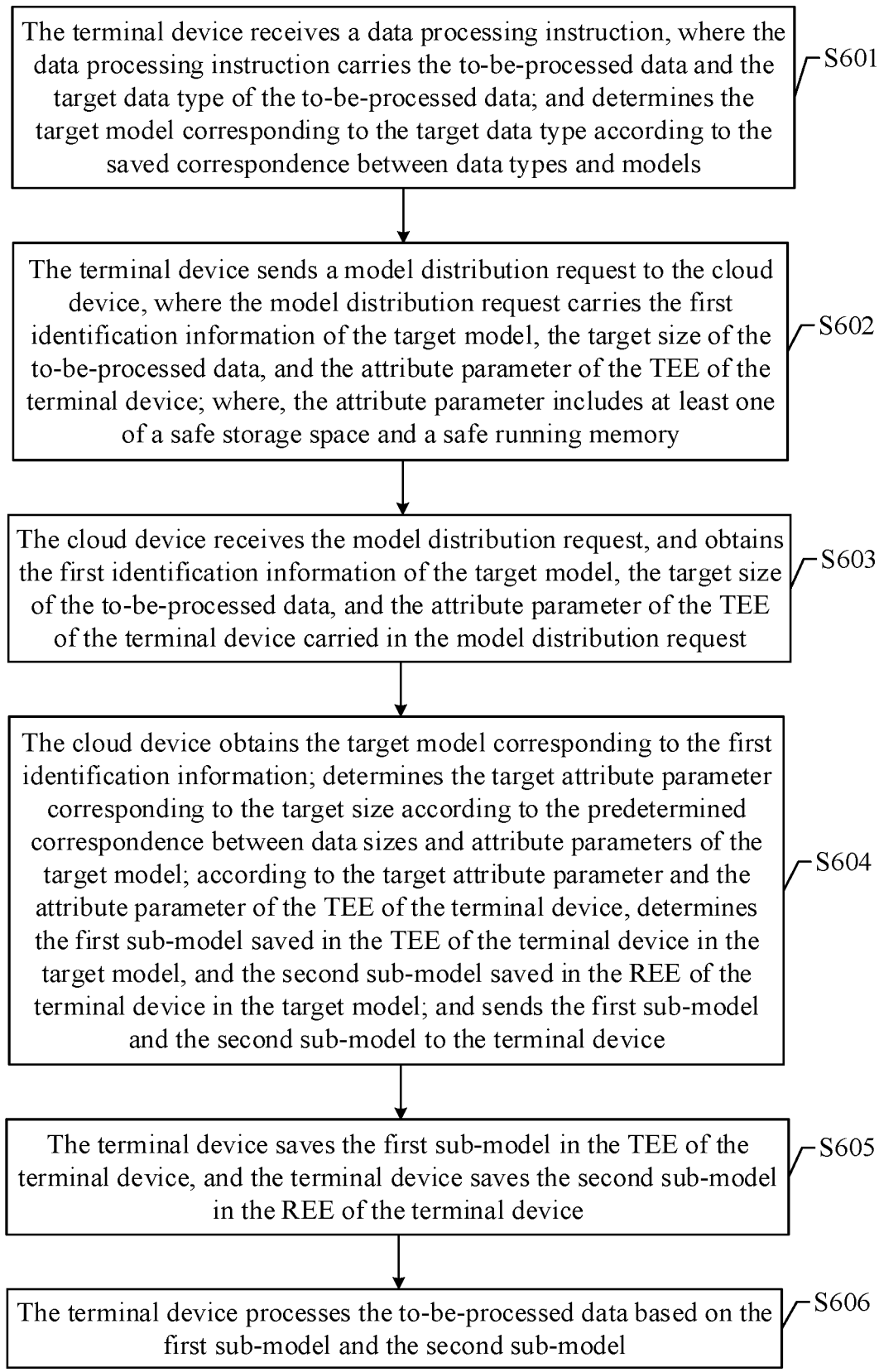
FIG. 6 shows a schematic diagram of a third data processing process provided by some embodiments.

For the convenience of understanding, the data processing process provided by the embodiments of the present application will be described below through a specific embodiment. FIG. 6 shows a schematic diagram of a third data processing process provided by some embodiments. As shown in FIG. 6, the process includes the following steps.

S601: the terminal device receives a data processing instruction, where the data processing instruction carries the to-be-processed data and the target data type of the to-be-processed data; and determines the target model corresponding to the target data type according to the saved correspondence between data types and models.

S602: the terminal device sends a model distribution request to the cloud device, where the model distribution request carries the first identification information of the target model, the target size of the to-be-processed data, and the attribute parameter of the TEE of the terminal device; where, the attribute parameter includes at least one of a safe storage space and a safe running memory.

S603: the cloud device receives the model distribution request, and obtains the first identification information of the target model, the target size of the to-be-processed data, and the attribute parameter of the TEE of the terminal device carried in the model distribution request.

S604: the cloud device obtains the target model corresponding to the first identification information; determines the target attribute parameter corresponding to the target size according to the predetermined correspondence between data sizes and attribute parameters of the target model; according to the target attribute parameter and the attribute parameter of the TEE of the terminal device, determines the first sub-model saved in the TEE of the terminal device in the target model, and the second sub-model saved in the REE of the terminal device in the target model; and sends the first sub-model and the second sub-model to the terminal device.

For the target model M, the cloud device can generate a unique model serial number (ID) corresponding to the target model, and generate a set of random verification data T. The random verification data T is input into the target model to obtain the ideal verification value λ corresponding to the verification data. The cloud device can calculate to obtain the hash value H1 corresponding to the second sub-model and the hash value H2 corresponding to the first sub-model based on the SHA-256 algorithm, etc., and generate a pair of symmetric working secret keys K. Optionally, the cloud device can record data information such as the model serial number (ID), the target model M, the ideal verification value X, and the hash value H2 corresponding to the first sub-model in the database.

Optionally, the cloud device may splice the model serial number (ID), the first sub-model, the second sub-model, the verification data T, the ideal verification value X corresponding to the verification data, the hash value H1 corresponding to the second sub-model and the symmetric working secret keys K according to the set format, to form a data string S. The cloud device uses the device public key to encrypt the data string S to obtain the ciphertext S'. The cloud device transmits the ciphertext S' through the network into the TEE operating system (trusted OS) of the terminal device.

S605: the terminal device saves the first sub-model in the TEE of the terminal device, and the terminal device saves the second sub-model in the REE of the terminal device.

Where, the terminal device may decrypt the ciphertext S' by using the device private key to restore the data. The serial number (ID) of the model and the second sub-model are transmitted to the REE operating system (rich OS). The terminal device stores the first sub-model, the verification data T, the ideal verification value X corresponding to the verification data, the hash value H1 corresponding to the second sub-model and the like of the decrypted S' in the safe storage area of the trusted OS. Subsequently, the storage of the first sub-model and the processing (calculation) for the to-be-processed data are all in the trusted OS, and the first sub-model is "available but not visible" to the outside world. Although the second sub-model is "visible" to the outside world, the second sub-model cannot be used independently, so as to effectively prevent the risk of the model being stolen.

S606: the terminal device processes the to-be-processed data based on the first sub-model and the second sub-model.

Where, the terminal device may first perform a process of model initialization. The process of model initialization is as follows.

The hash value of the second sub-model is calculated, and compared with the hash value H1 corresponding to the second sub-model; and whether the hash value is consistent with H1 is determined. Then, the parameter data of the second sub-model is loaded into the ordinary memory space of the REE, and the parameter data of the first sub-model is loaded into the safe memory space of the TEE.

According to the execution order of the processing layers included in the target model, the verification data T is input into the first sub-model and the second sub-model, to obtain the calculation result of the first sub-model and the second sub-model on the verification data T; and the calculation result is compared with the ideal verification value X corresponding to the verification data, and whether the calculation result is consistent with the ideal verification value X is determined.

The comparison result of whether the calculated hash value of the second sub-model is consistent with H1, the comparison result of whether the calculation result is consistent with the ideal verification value X, and the calculated hash value of the first sub-model are uploaded to the cloud device through the symmetric secret key encryption.

The cloud device compares whether the hash value of the first sub-model calculated by the terminal device is consistent with H2; and if it is consistent, the hash value of the second sub-model calculated by the terminal device is consistent with H1, and the calculation result of the verification data T calculated by the terminal device is also consistent with the ideal verification value X, then it is determined that the first sub-model and the second sub-model are safe and not tampered with. Otherwise, it is considered that the target model is tampered with, and the terminal device may be prompted that the first sub-model and the second sub-model have security risks; and the first sub-model and the second sub-model are reassigned and updated.

If the first sub-model and the second sub-model are safe, the to-be-processed data can be processed based on the first sub-model and the second sub-model.

In a possible implementation, when processing the to-be-processed data based on the first sub-model and the second sub-model, a certain amount of random noise (the impact of the random noise on the calculation result of the model can be ignored) can be added to the verification data T, the verification data T is randomly interspersed in the to-be-processed data, and the to-be-processed data carrying the verification data is processed based on the first sub-model and the second sub-model.

Figure 7:
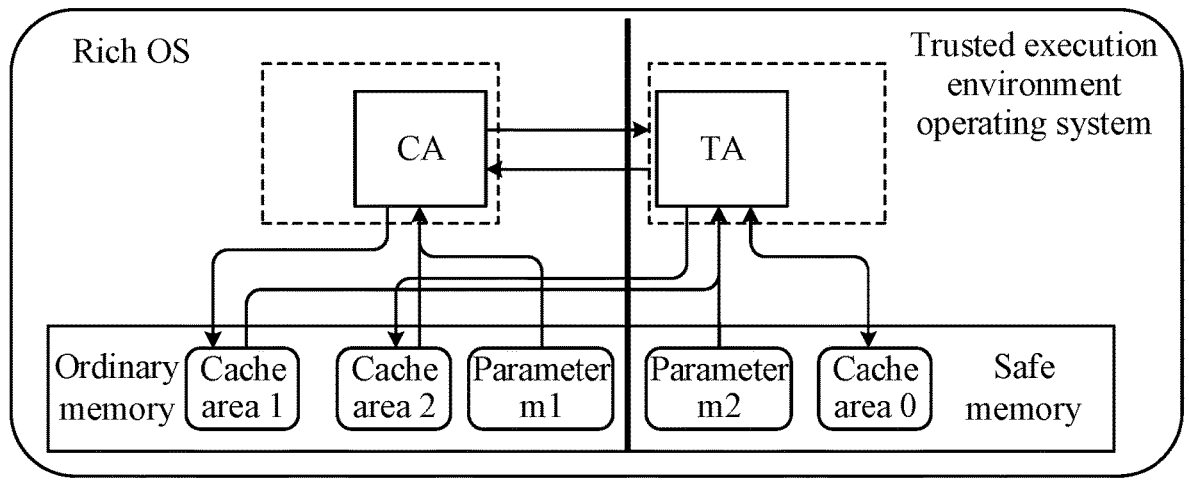
FIG. 7 shows a schematic diagram of a fourth data processing process provided by some embodiments.

For the convenience of understanding, the data processing process provided by the embodiments of the present application will be described below through a specific embodiment. FIG. 7 shows a schematic diagram of a fourth data processing process provided by some embodiments. As shown in FIG. 7, the process includes the following steps.

The terminal device may save the first sub-model (parameter m2) in the TEE of the terminal device, and save the second sub-model (parameter m1) in the REE of the terminal device. In a possible implementation, a client application (CA) installed in the rich OS may call a trusted application (TA) installed in the rich OS. The CA firstly applies for a data cache area 1 and a data cache area 2 in the ordinary memory of the rich OS in advance. The data cache area 1 is used to save the current processing result (that is, the output data of the corresponding processing layer of the second sub-model) of any processing layer in the second sub-model on the to-be-processed data, and the data cache area 2 is used to save the current processing result (that is, the input data of the corresponding processing layer of the second sub-model) of any processing layer in the first sub-model on the to-be-processed data.

Referring to FIG. 3A, FIG. 3B, and FIG. 3C, the processing layer A in the first sub-model may save the processing result for the to-be-processed data (the final processing result of the processing layer A on the to-be-processed data) in the data cache area 2. Optionally, the processing layer A in the first sub-model may save the intermediate processing result for the to-be-processed data in the cache area 0 of the safe memory.

The processing layer B in the second sub-model can obtain the to-be-processed data from the data cache area 2, process the to-be-processed data, and transmit the processing result to the processing layer C; the processing layer C can process the to-be-processed data, and save the processing result in the data cache area 1; and the processing layer D in the first sub-model can obtain the to-be-processed data in the data cache area 1, process the to-be-processed data, and save the final processing result for the to-be-processed data in the cache area 0 of the safe memory.

Embodiment 11

Figure 8:
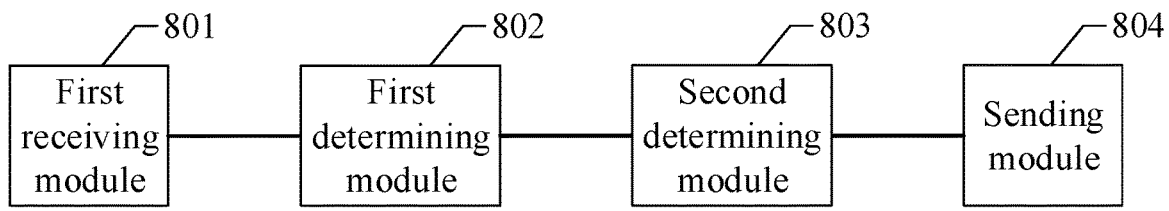
FIG. 8 shows a schematic diagram of a model protection apparatus provided by some embodiments.

Based on the same technical concept, the present application provides a model protection apparatus. FIG. 8 shows a schematic diagram of a model protection apparatus provided by some embodiments. As shown in FIG. 8, the apparatus includes:

the first receiving module 801, configured to obtain the first identification information of the target model, the target size of the to-be-processed data, and the attribute parameter of the TEE of a terminal device carried in the model distribution request in a case of receiving the model distribution request from the terminal device; where, the attribute parameter includes at least one of a safe storage space and a safe running memory;

the first determining module 802, configured to obtain the target model corresponding to the first identification information, and determine a target attribute parameter corresponding to the target size according to a predetermined correspondence between data sizes and attribute parameters of the target model;

the second determining module 803, configured to determine a first sub-model saved in the TEE of the terminal device in the target model according to the target attribute parameter and the attribute parameter of the TEE of the terminal device; and the sending module 804, configured to send the first sub-model to the terminal device, so that the terminal device saves the first sub-model in the TEE of the terminal device.

In a possible implementation, the apparatus further includes:

an update module, configured to determine processing layers of a to-be-sent model sent to the terminal device, where the processing layers of the to-be-sent model are all or part of processing layers of the target model; and update the target model by using the to-be-sent model.

In a possible implementation, the second determining module 803 is specifically configured to: select at least one first target processing layer from the target model; where, a total value of attribute parameters of the at least one first target processing layer does not exceed a value of the attribute parameter corresponding to the TEE of the terminal device; and determine the first sub-model according to the selected at least one first target processing layer.

In a possible implementation, the second determining module 803 is further configured to: determine each of second target processing layers in the target model except the at least one first target processing layer, and determine a second sub-model saved in a REE of the terminal device in the target model based on each second target processing layer; and the sending module 804 is specifically configured to send the first sub-model and the second sub-model to the terminal device, so that the terminal device saves the second sub-model in the REE of the terminal device.

In a possible implementation, the second determining module 803 is specifically configured to: for the sub-model saved in any of the TEE or REE, compare a target processing layer in the sub-model with processing layers in the target model, and determine each missing processing layer that is in the target model but not in the sub-model; for each missing processing layer, configure a link layer corresponding to the missing processing layer, and configure, in level indication information of the link layer, second identification information of a next processing layer the execution order of which is after the link layer according to execution order information of each of the processing layers in the target model; determine an execution order of each link layer and the target processing layer in the sub-model according to the execution order of each of the processing layers in the target model; and determine the sub-model based on the execution order and each link layer and the target processing layer in the sub-model.

In a possible implementation, the second determining module 803 is specifically configured to: in a case that the target model includes a verification layer, determine the verification layer as a processing layer in the first target processing layer; where an execution order of a first sub-verification layer in the verification layer is before an execution order of any processing layer in the target model, and an execution order of a second sub-verification layer in the verification layer is after the execution order of any processing layer in the target model; where the verification layer is configured to verify whether a processing result of the target model on the to-be-processed data is trusted.

In a possible implementation, the second determining module 803 is specifically configured to: rank each processing layer according to an execution order of each processing layer of the target model; and determine a first processing layer ranked first and a last processing layer ranked last in the ranking as processing layers in the first target processing layers.

In a possible implementation, the second determining module 803 is specifically configured to: in a case that the attribute parameter further includes a CPU peak computing performance of the TEE and a CPU peak computing performance of the REE of the terminal device and the CPU peak computing performance of the TEE of the terminal device is inferior to the CPU peak computing performance of the REE of the terminal device, determine a first target layer number according to a preset layer ratio threshold and a total number of processing layers in the target model; and select a first target layer number of processing layers from the target model, and determine the selected processing layers with the first target layer number as the at least one first target processing layer.

In a possible implementation, the second determining module 803 is specifically configured to: rank each processing layer according to an ascending order of values of attribute parameters of all processing layers of the target model; and starting from a processing layer ranked first in the ranking, select the first target layer number of processing layers in the ranking sequentially.

In a possible implementation, the second determining module 803 is specifically configured to: rank each processing layer according to an ascending order of values of attribute parameters of all processing layers of the target model;
  starting from a processing layer ranked first in the ranking each time, respectively and sequentially select different numbers of processing layers from the ranking, and determine the different numbers of processing layers selected each time as different candidate processing layer combinations respectively; where, a total value of attribute parameters of processing layers in each of the candidate processing layer combinations does not exceed the attribute parameter corresponding to the TEE of the terminal device;
  for each of the candidate processing layer combinations, determine a candidate layer number ratio of a layer number of processing layers in the candidate processing layer combination to a total number of the processing layers in the target model; and according to a pre-saved correspondence among each data size, a candidate processing layer combination and a running time, determine a candidate running time corresponding to the candidate processing layer combination;
  based on a multi-objective optimization algorithm, determine a target processing layer combination corresponding to an optimal layer number ratio and an optimal running time from each candidate layer number ratio and each candidate running time; and
  determine each processing layer in the target processing layer combination as the at least one first target processing layer.

Embodiment 12

Figure 9:
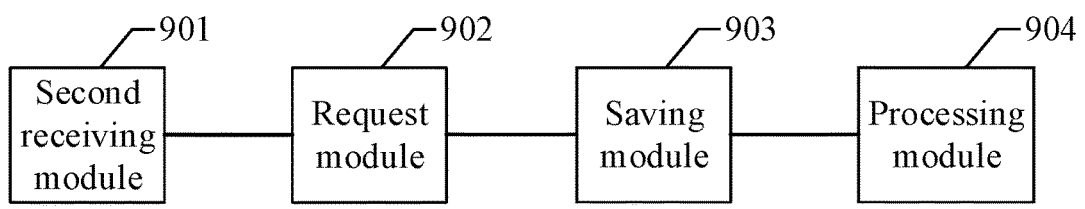
FIG. 9 shows a schematic diagram of a data processing apparatus provided by some embodiments.

Based on the same technical concept, the present application provides a model protection apparatus. FIG. 9 shows a schematic diagram of a data processing apparatus provided by some embodiments. As shown in FIG. 9, the apparatus includes:
  the second receiving module 901, configured to receive a data processing instruction, where the data processing instruction carries to-be-processed data and a target data type of the to-be-processed data; and determine a target model corresponding to the target data type according to a saved correspondence between data types and models;
  the request module 902, configured to send a model distribution request to a cloud device, where the model distribution request carries first identification information of the target model, a target size of the to-be-processed data, and an attribute parameter of a TEE of a terminal device; where the attribute parameter includes at least one of a safe storage space and a safe running memory;
  the saving module 903, configured to receive a first sub-model from the cloud device, and save the first sub-model in the TEE; where the first sub-model is determined by: the cloud device obtaining the target model corresponding to the first identification information according to the first identification information, determining a target attribute parameter corresponding to the target size according to a predetermined correspondence between data sizes and attribute parameters of the target model, and determining the first sub-model saved in the TEE of the terminal device in the target model according to the target attribute parameter and the attribute parameter of the TEE of the terminal device; and
  the processing module 904, configured to process the to-be-processed data based on the first sub-model.

In a possible implementation, the saving module 903 is specifically configured to receive the first sub-model and the second sub-model from the cloud device; and
  save the first sub-model in the TEE of the terminal device, and save the second sub-model in a REE of the terminal device;
  the processing module 904 is specifically configured to process the to-be-processed data based on the first sub-model and the second sub-model.

In a possible implementation, the processing module 904 is specifically configured to: for the sub-model saved in any of the TEE or REE, in a case that the sub-model includes a link layer, obtain second identification information, configured in level indication information of the link layer, of a next processing layer the execution order of which is after the link layer; and input a current processing result of the sub-model on the to-be-processed data to a processing layer corresponding to the second identification information according to the second identification information.

In a possible implementation, the processing module 904 is specifically configured to: in a case that the target model includes a verification layer, determine position information of preset verification data in the to-be-processed data based on a first sub-verification layer in the verification layer, determine third identification information of an output processing layer from which the second sub-verification layer in the verification layer obtains a verification result of the verification data, and send the position information and the third identification information to the second sub-verification layer; and based on the second sub-verification layer, obtain a verification processing result output by the output processing layer of the third identification information, obtain the verification result corresponding to the position information in the verification processing result, and determine whether the processing result of the target model on the to-be-processed data is trusted based on the verification result and a preset verification value.

Embodiment 13

Figure 10:
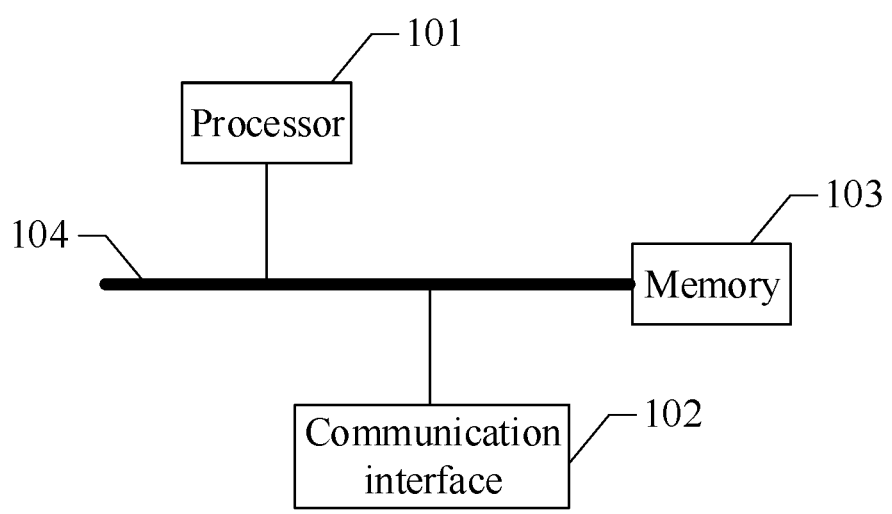
FIG. 10 shows a schematic structural diagram of an electronic device provided by some embodiments.

Based on the same technical concept, the present application further provides an electronic device. FIG. 10 shows a schematic structural diagram of an electronic device provided by some embodiments. As shown in FIG. 10, the electronic device includes: a processor 101, a communication interface 102, a memory 103 and a communication bus 104, where, the processor 101, the communication interface 102, and the memory 103 communicate with each other through the communication bus 104.

A computer program is stored in the memory 103, and the program, when executed by the processor 101, enables the processor 101 to implement the steps of any of the above-mentioned model protection methods, or implement the steps of any of the above-mentioned data processing methods.

The communication bus mentioned in the above electronic device may be a peripheral component interconnect (PCI) bus or an extended industry standard architecture (EISA) bus or the like. The communication bus can be divided into an address bus, a data bus, a control bus, and the like. For ease of representation, only one thick line is used in the figure, but it does not mean that there is only one bus or one type of bus.

The communication interface 102 is used for communication between the electronic device and other devices.

The memory may include a random access memory (RAM), and may also include a non-volatile memory (NVM), such as at least one disk memory. Optionally, the memory may also be at least one storage device located away from the aforementioned processor.

The above processor may be a general-purpose processor, including a central processing unit, a network processor (NP), etc.; and the above processor may also be a digital signal processor (DSP), an application specific integrated circuit, a field-programmable gate array or other programmable logic device, a discrete gate or a transistor logic device, and a discrete hardware component, etc.

Based on the same technical idea, the embodiment of application provides a computer-readable storage medium, storing computer programs which can be executed by the electronic device. The programs, when run on the electronic device, enable the electronic device to implement steps of any of the above model protection methods, or implement steps of any of the above data processing methods.

The above-mentioned computer-readable storage medium may be any available medium or data storage device that can be accessed by the processor of the electronic device, including but not limited to: a magnetic storage, such as a floppy disk, a hard disk, a magnetic tape, a magneto-optical disk (MO); an optical memory, such as a CD, a DVD, a BD, a high-definition versatile disc (HVD); and a semiconductor memory, such as a ROM, an erasable programmable read-only memory (EPROM), an electrically erasable programmable read only memory (EEPROM), a non-volatile memory (NAND FLASH), a solid state disk (SSD).

Based on the same technical idea, the present application provides a computer program product, including computer program codes. The computer program codes, when run on a computer, enable the computer to implement steps of any of the above model protection methods, or implement steps of any of the above data processing methods.

All or part of the above embodiments may be implemented by software, hardware, firmware or any combination thereof, and all or part of the above embodiments may be implemented in the form of a computer program product. The computer program product includes one or more computer instructions, and when the one or more computer instructions are loaded and executed on the computer, the processes or functions according to the embodiments of the present application will be generated in whole or in part.

The skilled in the art should understand that the embodiments of the present application may be provided as a method, a system or a computer program product. Therefore, the present application can adopt forms of full hardware embodiments, full software embodiments, or embodiments combining software and hardware aspects. Moreover, the present application can adopt a form of the computer program products implemented on one or more computer available storage mediums (including but not limited to a disk memory, compact disc read only memory (CD-ROM), an optical memory and the like) containing computer available program codes.

The present application is described with reference to flow diagrams and/or block diagrams of the methods, the devices (systems), and computer program products according to the present application. It should be understood that each flow and/or block in the flow diagrams and/or the block diagrams and combinations of the flows and/or the blocks in the flow diagrams and/or the block diagrams can be implemented by computer program instructions. These computer program instructions may be provided to a processor of a general-purpose computer, a special-purpose computer, an embedded processing machine or other programmable data processing devices to generate a machine, such that the instructions, when executed by the processor of the computer or other programmable data processing devices, generate an apparatus for implementing functions specified in one or more flows in the flow diagrams and/or one or more blocks in the block diagrams.

These computer program instructions may also be stored in a computer readable memory which can guide the computer or other programmable data processing devices to work in a specific mode, thus the instructions stored in the computer readable memory generates an article of manufacture that includes a commander apparatus that implement the functions specified in one or more flows in the flow diagrams and/or one or more blocks in the block diagrams.

These computer program instructions may also be loaded to the computer or other programmable data processing devices, so that a series of operating steps are executed on the computer or other programmable devices to generate computer-implemented processing, such that the instructions executed on the computer or other programmable devices provide steps for implementing the functions specified in one or more flows in the flow diagrams and/or one or more blocks in the block diagrams.

Obviously, those skilled in the art can make various modifications and variations to the present application without departing from the spirit and scope of the present application. In this way, if these modifications and variations of the present application fall within the scope of the claims of the present application and their equivalent art, the present application also intends to include these modifications and variations.

What is claimed is:

1. A model protection method, comprising:
in response to receiving a model distribution request from a terminal device, obtaining first identification information of a target model, a target size of to-be-processed data, and an attribute parameter of a trusted execution environment (TEE) of the terminal device carried in the model distribution request; wherein the attribute parameter comprises at least one of a safe storage space and a safe running memory;
obtaining the target model corresponding to the first identification information, and determining a target attribute parameter corresponding to the target size according to a predetermined correspondence between data sizes and attribute parameters of the target model;
determining a first sub-model saved in the TEE of the terminal device in the target model according to the target attribute parameter and the attribute parameter of the TEE of the terminal device; and
sending the first sub-model to the terminal device, so that the terminal device saves the first sub-model in the TEE of the terminal device;
wherein, said determining the first sub-model saved in the TEE of the terminal device in the target model according to the target attribute parameter and the attribute parameter of the TEE of the terminal device, comprises:
selecting at least one first target processing layer from the target model; wherein a total value of attribute parameters of the at least one first target processing layer does not exceed a value of the attribute parameter corresponding to the TEE of the terminal device; and
determining the first sub-model according to the selected at least one first target processing layer;
wherein after said selecting the at least one first target processing layer from the target model, and before said sending the first sub-model to the terminal device, the method further comprises:
determining each of second target processing layers in the target model except the at least one first target processing layer, and determining a second sub-model saved in a rich execution environment (REE) of the terminal device in the target model based on each of the second target processing layers;
wherein said sending the first sub-model to the terminal device comprises:
sending the first sub-model and the second sub-model to the terminal device, so that the terminal device saves the second sub-model in the REE of the terminal device;
wherein said determining the sub-model based on the selected at least one target processing layer, comprises:
for the sub-model saved in any of the TEE or REE, comparing a target processing layer in the sub-model with processing layers in the target model, and determining each missing processing layer that is in the target model but not in the sub-model;
for each missing processing layer, configuring a link layer corresponding to the missing processing layer, and configuring, in level indication information of the link layer, second identification information of a next processing layer an execution order of which is after the link layer according to execution order information of each of the processing layers in the target model;
determining an execution order of each link layer and the target processing layer in the sub-model according to an execution order of each of the processing layers in the target model; and
determining the sub-model based on the execution order and each link layer and the target processing layer in the sub-model.

2. The method according to claim 1, wherein after said determining the target attribute parameter corresponding to the target size, and before said determining the first sub-model saved in the TEE of the terminal device in the target model according to the target attribute parameter and the attribute parameter of the TEE of the terminal device, the method further comprises:
determining processing layers of a to-be-sent model sent to the terminal device, wherein the processing layers of the to-be-sent model are all or part of processing layers of the target model; and
updating the target model by using the to-be-sent model.

3. The method according to claim 1, wherein said selecting the at least one first target processing layer from the target model comprises:
in response to the target model comprising a verification layer, determining the verification layer as a processing layer included in the first target processing layer;
wherein an execution order of a first sub-verification layer in the verification layer is before an execution order of any processing layer included in the target model, and an execution order of a second sub-verification layer in the verification layer is after the execution order of any processing layer included in the target model;
wherein the verification layer is configured to verify whether a processing result of the target model on the to-be-processed data is trusted.

4. The method according to claim 1, wherein said selecting the at least one first target processing layer from the target model comprises:
ranking each processing layer according to an execution order of each processing layer of the target model; and
determining a first processing layer ranked first and a last processing layer ranked last in the ranking as processing layers included in the first target processing layers.

5. The method according to claim 1, wherein said selecting the at least one first target processing layer from the target model comprises:
in response to the attribute parameter further comprising a central processing unit (CPU) peak computing performance of the TEE and a CPU peak computing performance of the REE of the terminal device and the CPU peak computing performance of the TEE of the terminal device is inferior to the CPU peak computing performance of the REE of the terminal device, determining a first target layer number according to a preset layer ratio threshold and a total number of processing layers in the target model; and
selecting a first target layer number of processing layers from the target model, and determining the selected processing layers with the first target layer number as the at least one first target processing layer.

6. The method according to claim 5, wherein said selecting the first target layer number of processing layers from the target model comprises:

ranking each processing layer according to an ascending order of values of attribute parameters of all processing layers of the target model; and starting from a processing layer ranked first in the ranking, selecting the first target layer number of processing layers in the ranking sequentially.

7. The method according to claim 1, wherein said selecting the at least one first target processing layer from the target model comprises:

ranking each processing layer according to an ascending order of values of attribute parameters of all processing layers of the target model;

starting from a processing layer ranked first in the ranking each time, respectively and sequentially selecting different numbers of processing layers from the ranking, and determining the different numbers of processing layers selected each time as different candidate processing layer combinations respectively; wherein, a total value of attribute parameters of processing layers in each of the candidate processing layer combinations does not exceed the attribute parameter corresponding to the TEE of the terminal device;

for each of the candidate processing layer combinations, determining a candidate layer number ratio of a layer number of processing layers in the candidate processing layer combination to a total number of the processing layers in the target model; and determining a candidate running time corresponding to the candidate processing layer combination according to a pre-saved correspondence among each data size, a candidate processing layer combination and a running time;

determining, based on a multi-objective optimization algorithm, a target processing layer combination corresponding to an optimal layer number ratio and an optimal running time from each candidate layer number ratio and each candidate running time; and determining each processing layer in the target processing layer combination as the at least one first target processing layer.

8. A data processing method, comprising:

receiving a data processing instruction, wherein the data processing instruction carries to-be-processed data and a target data type of the to-be-processed data; and determining a target model corresponding to the target data type according to a saved correspondence between data types and models;

sending a model distribution request to a cloud device, wherein the model distribution request carries first identification information of the target model, a target size of the to-be-processed data, and an attribute parameter of a trusted execution environment (TEE) of a terminal device; wherein the attribute parameter comprises at least one of a safe storage space and a safe running memory;

receiving a first sub-model from the cloud device, and saving the first sub-model in the TEE; wherein the first sub-model is determined by: the cloud device obtaining the target model corresponding to the first identification information according to the first identification information, determining a target attribute parameter corresponding to the target size according to a predetermined correspondence between data sizes and attribute parameters of the target model, and determining the first sub-model saved in the TEE of the terminal device in the target model according to the target attribute parameter and the attribute parameter of the TEE of the terminal device; and processing the to-be-processed data based on the first sub-model;

wherein said receiving the first sub-model from the cloud device comprises:

receiving the first sub-model and a second sub-model from the cloud device;

wherein said saving the first sub-model in the TEE comprises:

saving the first sub-model in the TEE of the terminal device, and saving the second sub-model in a rich execution environment (REE) of the terminal device;

wherein said processing the to-be-processed data based on the first sub-model comprises:

processing the to-be-processed data based on the first sub-model and the second sub-model;

wherein said processing the to-be-processed data based on the first sub-model and the second sub-model comprises:

for the sub-model saved in any of the TEE or REE, in response to the sub-model comprising a link layer, obtaining second identification information, configured in level indication information of the link layer, of a next processing layer an execution order of which is after the link layer; and inputting a current processing result of the sub-model on the to-be-processed data to a processing layer corresponding to the second identification information according to the second identification information;

wherein said processing the to-be-processed data based on the first sub-model comprises:

in response to the target model comprising a verification layer, determining position information of preset verification data in the to-be-processed data based on a first sub-verification layer in the verification layer, determining third identification information of an output processing layer from which the second sub-verification layer in the verification layer obtains a verification result of the verification data, and sending the position information and the third identification information to the second sub-verification layer; and obtaining a verification processing result output by the output processing layer of the third identification information based on the second sub-verification layer, obtaining the verification result corresponding to the position information in the verification processing result, and determining whether the processing result of the target model on the to-be-processed data is trusted based on the verification result and a preset verification value.

* * * * *